US012576825B2

(12) United States Patent
Zhang et al.

(10) Patent No.: US 12,576,825 B2
(45) Date of Patent: Mar. 17, 2026

(54) BRAKING APPARATUS, BRAKING SYSTEM, AND VEHICLE

(71) Applicant: SHENZHEN YINWANG INTELLIGENT TECHNOLOGIES CO., LTD., Shenzhen (CN)

(72) Inventors: Xin Zhang, Shenzhen (CN); Yuhao Lu, Shanghai (CN); Yongsheng Zhang, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/650,959

(22) Filed: Apr. 30, 2024

(65) Prior Publication Data

US 2024/0278759 A1 Aug. 22, 2024

Related U.S. Application Data

(63) Continuation of application No. PCT/CN2021/127775, filed on Oct. 30, 2021.

(51) Int. Cl.
*B60T 13/66* (2006.01)
*B60T 7/04* (2006.01)
(52) U.S. Cl.
CPC ............ *B60T 13/662* (2013.01); *B60T 7/042* (2013.01)
(58) Field of Classification Search
CPC .......... B60T 13/00; B60T 13/12; B60T 13/66; B60T 13/662; B60T 13/745; B60T 7/042; B60T 11/16; B60T 8/00; B60T 8/368; B60T 8/38; B60T 8/4072; B60T 8/4081;

B60T 8/4872; B60T 17/02; B60T 17/221; B60T 17/042; B60T 2270/10; B60T 2270/20; B60T 2270/30; B60T 2270/82; B60T 11/165; F16D 66/00; F16D 2066/003
USPC ..................................................... 701/71–81
See application file for complete search history.

(56) References Cited

U.S. PATENT DOCUMENTS

| | | | | |
|---|---|---|---|---|
| 9,566,972 | B2 * | 2/2017 | Voigtmann | G01B 7/003 |
| 9,878,697 | B2 * | 1/2018 | Leiber | B60T 7/042 |
| 11,745,717 | B2 * | 9/2023 | Feigel | B60T 17/221 |
| | | | | 701/34.4 |
| 2005/0268608 | A1 * | 12/2005 | Ludsteck | F16D 25/088 |
| | | | | 60/533 |
| 2017/0021813 | A1 * | 1/2017 | Tandler | B60T 8/368 |

(Continued)

FOREIGN PATENT DOCUMENTS

| | | |
|---|---|---|
| CN | 104691526 A | 6/2015 |
| CN | 105073520 A | 11/2015 |

(Continued)

*Primary Examiner* — Logan M Kraft
*Assistant Examiner* — Johnny H Hoang
(74) *Attorney, Agent, or Firm* — Conley Rose, P.C.

(57) ABSTRACT

A braking apparatus includes a hydraulic block, a master cylinder part, and a travel sensor. The hydraulic block is provided with a first groove and a second groove. The second groove extends in a first direction. The master cylinder part is located in the second groove and is in sliding contact with the second groove. The master cylinder part in the second groove is internally provided with a permanent magnet. The travel sensor is located in the first groove and is fixedly coupled to the hydraulic block, and is configured to detect a movement amount of the permanent magnet.

20 Claims, 10 Drawing Sheets

(56) References Cited

U.S. PATENT DOCUMENTS

| 2021/0129816 A1* | 5/2021 | Weh | B60T 13/66 |
| 2021/0262829 A1* | 8/2021 | Moriya | G01D 5/14 |
| 2024/0278759 A1* | 8/2024 | Zhang | B60T 13/662 |

FOREIGN PATENT DOCUMENTS

| CN | 105722736 A | 6/2016 |
| CN | 106364472 A | 2/2017 |
| CN | 107264496 A | 10/2017 |
| CN | 108860100 A | 11/2018 |
| CN | 113226876 A | 8/2021 |
| CN | 113494929 A | 10/2021 |

* cited by examiner

100

23

23

BRAKING APPARATUS, BRAKING SYSTEM, AND VEHICLE

CROSS-REFERENCE TO RELATED APPLICATIONS

This is a continuation of International Patent Application No. PCT/CN2021/127775 filed on Oct. 30, 2021, which is hereby incorporated by reference in its entirety.

TECHNICAL FIELD

The present disclosure relates to the field of vehicle technologies, and in particular, to a braking apparatus, a braking system, and a vehicle.

BACKGROUND

A braking system of a vehicle is an important component of a vehicle safety control system. A main function of the braking system is to decelerate or even stop a traveling vehicle, or to keep a speed of a vehicle traveling downhill stable, or to keep a stopped vehicle from moving.

The braking system includes a braking apparatus, and a travel sensor in the braking apparatus generally uses a magnetic induction principle. When a permanent magnet moves with a change of a pedal travel, a sensing element in the travel sensor detects a magnetic field change and converts the magnetic field change into an electrical signal. However, a distance (an air gap) between the permanent magnet and the sensing element has great impact on magnetic field strength at the travel sensor. A larger air gap is less conducive to ensuring signal precision of the travel sensor. In addition, a large quantity of dimension chains between the permanent magnet and the sensing element also affects quality control of a signal precision level of the travel sensor.

Therefore, a layout design of the permanent magnet and the travel sensor is quite important to control of the signal precision of the travel sensor.

SUMMARY

Embodiments of this disclosure provide a braking apparatus, a braking system, and a vehicle. A reasonable layout of a permanent magnet and a travel sensor in the braking apparatus is performed, so that a dimension chain between the permanent magnet and a sensing element in the travel sensor is reduced, a gap between the permanent magnet and the travel sensor is reduced, and signal precision of the travel sensor is effectively improved.

According to a first aspect, an embodiment of this disclosure provides a braking apparatus. The braking apparatus includes a hydraulic block, a master cylinder part, and a travel sensor. The hydraulic block is provided with a first groove and a second groove. The second groove extends in a first direction. The master cylinder part is located in the second groove and is in sliding contact with the second groove. The master cylinder part in the second groove moves back and forth in the first direction. The master cylinder part is internally provided with a permanent magnet. The travel sensor is located in the first groove and is fixedly connected to the hydraulic block, and is configured to detect a movement amount of the permanent magnet. Both the master cylinder part and the travel sensor are installed on the hydraulic block, the first groove is disposed close to the second groove, the travel sensor is located in the first groove, and the master cylinder part is located in the second groove. That is, the travel sensor is disposed close to the master cylinder part.

The master cylinder part includes a first piston. The permanent magnet is disposed in the first piston. The first piston may move back and forth in an axial direction (namely, the first direction) of the first piston. The permanent magnet is located inside the first piston and may also move back and forth in the first direction with the first piston. The hydraulic block is internally provided with a pipeline. There is a brake fluid in the pipeline. The master cylinder part is connected to a brake pedal. An operation force applied at the brake pedal is transferred to the brake fluid in the hydraulic block through the master cylinder part. In a process of applying the operation force at the brake pedal, the travel sensor is configured to detect a travel of the permanent magnet relative to the hydraulic block, output an electrical signal, and finally drive a brake unit, to implement precise control of a speed of a vehicle.

In this disclosure, signal precision of the travel sensor is improved through a reasonable layout of the permanent magnet and the travel sensor. The permanent magnet is disposed inside the master cylinder part, and there is no need to dispose, on the hydraulic block, a hole part for separately installing the permanent magnet. This simplifies a structure of the hydraulic block, provides more spaces for arranging the pipeline in the hydraulic block, and reduces a dimension chain between the permanent magnet and the travel sensor. The dimension chain between the permanent magnet and the travel sensor herein may be understood as tolerance accumulation between the permanent magnet and the travel sensor. This helps simplify an installation method of the braking apparatus, improves installation precision of the braking apparatus, and also improves precision of travel detection of the braking apparatus. The travel sensor is installed in the first groove, located on one side of the master cylinder part, and disposed close to the permanent magnet, that is, the travel sensor is directly fixed on the hydraulic block. This reduces the dimension chain between the travel sensor and the permanent magnet, and helps improve signal precision of the travel sensor. In the implementation of this disclosure, the travel sensor is disposed close to the permanent magnet, to reduce a gap between the permanent magnet and the travel sensor as much as possible. This effectively improves signal precision of the travel sensor.

In a possible implementation, the permanent magnet moves between a first position and a second position, a central position between the first position and the second position is vertically projected on the travel sensor in a second direction, and the second direction is perpendicular to the first direction. In other words, the travel sensor directly faces the central position between the first position and the second position in the second direction. That is, the first position and the second position are symmetrical with respect to the travel sensor. Directly facing may be understood as that a connection line between the central position and a point on the travel sensor is parallel to the second direction. In this implementation, the central position is set to be vertically projected on the travel sensor in the second direction, so that a distance between the permanent magnet and the travel sensor is not excessively large when the permanent magnet moves back and forth. In this way, the travel sensor can detect sufficient magnetic field strength. This helps improve precision of travel measurement, and simplifies a calibration process.

In some other implementations, the vertical projection of the central position in the second direction may alternatively not be on the travel sensor, that is, the first position and the second position are asymmetric with respect to the travel sensor. In this way, signal precision of the travel sensor can be ensured provided that a travel interval with high magnetic field strength is selected.

In a possible implementation, the travel sensor is provided with a sensing element, the sensing element is located in the first groove, and a distance between the sensing element and the permanent magnet is less than a threshold. For example, the distance between the sensing element and the permanent magnet is less than 10 millimeters (mm). In this way, the sensing element can sense a magnetic field with specific magnetic induction strength, and can meet a requirement for sealing and isolation. For example, the distance between the sensing element and the permanent magnet may be 8 mm, which may be further obtained through an experiment or simulation. Simulation is used as an example. The distance between the sensing element and the permanent magnet is related to a dimension of the first piston, a distance between the first groove and the second groove, and the like. These pieces of data are input into a simulation model, so that magnetic induction strength, of the permanent magnet, that can be sensed by the sensing element and that is greater than 10 millitesla (mT) is obtained. The sensing element may be a Hall element, or may be another element. The sensing element obtains the movement amount of the permanent magnet based on a magnetic field change, and transmits the movement amount to a control unit in a form of an electrical signal. If the distance between the sensing element and the permanent magnet is excessively large, the magnetic field strength at the sensing element is weak. In this way, when a magnetic field changes, it is difficult for the sensing element to precisely sense a change amount of the magnetic field, and consequently signal precision of the travel sensor is affected. In this implementation, the sensing element is disposed in the first groove and close to the permanent magnet. This helps ensure signal precision of the travel sensor. That the sensing element is disposed close to the permanent magnet may be understood as that a gap between the sensing element and the permanent magnet is as small as possible in a case in which overall performance of the braking apparatus is ensured. Further, the gap may be disposed based on an actual situation. It should be noted that, disposing the travel sensor close to the permanent magnet can improve precision of travel measurement, and help control a braking system more precisely. However, the travel sensor is disposed outside the permanent magnet and does not communicate with the permanent magnet, so that a risk of contacting the brake fluid by the travel sensor can be reduced, normal working of the travel sensor can be ensured, and a service life can be extended.

In a possible implementation, the hydraulic block is internally provided with a pipeline, the pipeline is configured to transmit a brake fluid, and the pipeline is arranged in the hydraulic block to avoid an area between the first groove and the second groove, so that a distance between the first groove and the second groove is controlled within a small enough range. That is, the pipeline is not disposed between the first groove and the second groove. In other words, a gap between the first groove and the second groove is small, and the pipeline cannot be disposed. In this way, it can be ensured that the distance between the travel sensor and the permanent magnet is small. This helps improve signal precision of the travel sensor, and also avoids impact of the pipeline on a signal received by the travel sensor.

In a possible implementation, the first groove and the second groove are sealed and isolated, that is, a space of the first groove does not communicate with a space of the second groove, to prevent the brake fluid in the second groove from flowing to the first groove, and affecting performance of the braking apparatus. Wall thickness of the hydraulic block between the first groove and the second groove meets a minimum requirement for sealing and isolation, to ensure that the distance between the travel sensor and the permanent magnet is as small as possible.

In a possible implementation, the travel sensor further includes a housing and a sensing substrate. The sensing substrate is fixed inside the housing, the sensing element is disposed on the sensing substrate, and the sensing element is electrically connected to the sensing substrate. The sensing element is located on a side that is of the sensing substrate and that is close to the master cylinder part, to ensure that a distance between the sensing element and the master cylinder part is as small as possible.

In some possible implementations, a fixing manner between the travel sensor and the hydraulic block may be fixing through a screw, fixing through a snap, fixing through interference fit, or fixing through crimping, or the like. This is not limited in this disclosure.

In a possible implementation, the braking apparatus includes a control unit, the control unit and the hydraulic block are disposed in a stacked manner, an opening of the first groove faces the control unit, the first groove communicates with an internal space of the control unit, and the travel sensor extends into the internal space of the control unit, to implement sealing of the travel sensor. A part of the travel sensor extends into the first groove and is disposed adjacent to the permanent magnet, and the other part of the travel sensor extends into the internal space of the control unit and is configured to be electrically connected to a control substrate of the control unit. The hydraulic block and the control unit form an accommodation space, the travel sensor is located in the accommodation space, and the hydraulic block and the control unit jointly perform a sealing function on the travel sensor, to prevent dust or water from an external environment from entering the travel sensor, and affecting performance of the travel sensor. The travel sensor is always in a sealed environment formed by the hydraulic block and the control unit, and does not need to perform sealing protection (where for example, a side that is of the housing of the travel sensor and that faces the permanent magnet may be provided with an opening, and the housing does not completely isolate the sensing substrate and the sensing element from the outside), so that costs are reduced. In addition, the sensing substrate and the sensing element in the travel sensor do not need to be sealed for protection. This also reduces a volume of the travel sensor, saves an internal space of the braking apparatus, and further reduces the distance from the travel sensor to the permanent magnet.

In a possible implementation, the braking apparatus is provided with a sealing structure, and the sealing structure is located between the control unit and the hydraulic block. The sealing structure may be a sealing ring, and the sealing ring seals between the hydraulic block and the control unit that are disposed in a stacked manner, so that a strict waterproof and dustproof level may be achieved, thereby helping protect a structure inside the control unit and the travel sensor. In some implementations, the sealing structure may alternatively be rubber, and sealing between the hydraulic block and the control unit may be implemented by coating rubber. The control unit and the hydraulic block are connected in a sealed manner, so that the travel sensor is sealed, and the control unit isolates the travel sensor from the external environment. In this way, the travel sensor is always in the sealed environment formed by the hydraulic block and the control unit, and does not need to perform sealing protection, so that costs are reduced.

In a possible implementation, the travel sensor and the control unit are of a split structure. In an implementation of this disclosure, the travel sensor is directly fixed on the hydraulic block, and the control unit is also directly fixed on the hydraulic block, so that a quantity of dimension chains between the travel sensor and the control substrate of the control unit is small and the dimension chain is easy to assemble. An electrical connection between the travel sensor and the control substrate of the control unit can implement good electrical contact by using control of a component dimension and an assembly process, and there is a sufficient design dimension margin for the electrical contact (which may be understood as that a contact area of the electrical connection between the travel sensor and the control substrate of the control unit may be designed to be small, to implement a good electrical connection, or a contact area remains unchanged, and a good electrical connection can be implemented even if there is some misplacement). In this way, requirements on the component dimension and the assembly process may be reduced, thereby helping reduce costs and improve an assembly yield rate. In addition, the travel sensor is directly fixed on the hydraulic block, so that a quantity of dimension chains between the travel sensor and the permanent magnet is small. This helps improve signal precision of the travel sensor. In addition, the quantity of dimension chains between the travel sensor and the permanent magnet is small, so that a processing process and time are reduced. This helps reduce the costs and also helps improve the assembly yield rate.

In a possible implementation, the travel sensor and the master cylinder part are arranged in a direction perpendicular to that in which the hydraulic block and the control unit are stacked. The independent travel sensor is disposed on one side of the master cylinder part and is disposed adjacent to the master cylinder part, and the travel sensor may be disposed on any side of the master cylinder part as required. In this implementation, the travel sensor is disposed on one side of the master cylinder part in a direction perpendicular to that in which the hydraulic block and the control unit are stacked. This simplifies a structure of the travel sensor. The first groove is a deep groove, and the sensing element of the travel sensor is deep into the first groove, and is not vulnerable to impact of magnetic leakage of a solenoid valve inside the control unit. This helps improve signal precision of the travel sensor.

In a possible implementation, the first groove is located between the master cylinder part and the control unit. In other words, the travel sensor is located on a side that is of the master cylinder part and that is close to the control unit, the independent travel sensor is disposed on one side of the master cylinder part and is disposed adjacent to the master cylinder part, and the travel sensor may be disposed on any side of the master cylinder part as required. In this implementation, the travel sensor is located on the side that is of the master cylinder part and that is close to the control unit, that is, the first groove is a shallow groove. This helps improve feasibility of more reasonable layouts for pipelines arranged vertically and horizontally inside the hydraulic block, has less interference with pipeline arrangement inside the hydraulic block, and facilitates miniaturization and processing convenience of the braking apparatus.

In a possible implementation, the travel sensor is provided with a housing, the housing includes a mounting part and a connecting part, the mounting part is located in the first groove and is fixedly connected to the hydraulic block, the sensing element is located in the mounting part, one end of the connecting part is connected to the mounting part, and the other end of the connecting part extends into the control unit. The mounting part and the connecting part are disposed in an included angle. For example, the mounting part and the connecting part may be of an L-shaped structure, that is, an included angle between the mounting part and the connecting part is a right angle. Disposing the connecting part and the mounting part of the L-shaped structure helps implement disposing of the sensing element adjacent to the permanent magnet, improve travel detection precision, and implement the electrical connection between the sensing substrate and the control substrate. When the first groove is located between the master cylinder part and the control unit, that is, when the travel sensor is located on a side that is of the master cylinder part and that is close to the control unit, to facilitate the electrical connection between the sensing substrate of the travel sensor and the control substrate of the control unit, the housing of the travel sensor may be designed as an L-shaped structure, that is, the mounting part and the connecting part form an L-shaped structure. In this way, the sensing element can be disposed close to the master cylinder part, and the effective electrical connection between the sensing substrate and the control substrate can be implemented, so that an electrical signal generated by the sensing element is transmitted to the control unit. The electrical connection between the travel sensor and the control substrate may be a connector clip, spring contact, metal pad contact, or the like. This is not limited in this disclosure.

In a possible implementation, the braking apparatus is provided with a structure sleeve, the structure sleeve is made of a non-ferromagnetic material, and the structure sleeve wraps the permanent magnet and is located inside the master cylinder part. Some structures of the master cylinder part are usually made of ferromagnetic materials, for example, a spring and a push rod. The spring cooperates with the permanent magnet, and the push rod cooperates with the first piston for back-and-forth movement of the first piston and the permanent magnet. The structures made of these ferromagnetic materials change a magnetic field of the permanent magnet, affect a signal received by the travel sensor, and are not conducive to improving signal precision of the travel sensor. In this implementation of this disclosure, the structure sleeve made of a non-ferromagnetic material (for example, plastic or aluminum) is used to wrap the permanent magnet, that is, the permanent magnet is isolated from ferromagnetic materials such as a spring and a push rod, to avoid impact of the ferromagnetic materials such as the spring and the push rod on the magnetic field of the permanent magnet. This help improve signal precision of the travel sensor.

In some possible implementations, a distance between the permanent magnet and the spring and a distance between the permanent magnet and the push rod may be set to be large. In this way, impact of the ferromagnetic materials such as the spring and the push rod on the magnetic field of the permanent magnet can also be avoided. Alternatively, some gaskets made of non-ferromagnetic materials are disposed between the permanent magnet and the spring and between the permanent magnet and the push rod, to avoid impact of the ferromagnetic materials such as the spring and the push rod on the magnetic field of the permanent magnet.

In a possible implementation, the master cylinder part is provided with an elastic component, the structure sleeve includes a main body part and a guiding part, the main body part wraps the permanent magnet, and one end of the elastic component is sleeved on the guiding part and abuts against the main body part. The main body part and the guiding part are arranged in the first direction and are connected as a whole. For example, an end face dimension of the guiding part may be set to be less than an end face dimension of the main body part, and a guiding part with a small dimension is configured to guide and constrain assembly of the elastic component. This helps avoid a problem such as deflection or sliding of the elastic component in a back-and-forth movement process of the master cylinder part.

The operation force applied at the brake pedal is transmitted to the push rod, the push rod acts on the first piston and pushes the first piston to move, the elastic component is compressed, and applies an elastic force to a magnet assembly (where the permanent magnet and the structure sleeve form the magnet assembly). The force applied by the elastic component to the magnet assembly is opposite to a direction of a force applied by the push rod to the first piston. Therefore, the first piston and the magnet assembly move back and forth under a joint action of the elastic component and the push rod.

In a possible implementation, the master cylinder part includes a first piston, the permanent magnet and the structure sleeve are both located inside the first piston, the main body part includes a body and a limiting part, the limiting part is encircled around an outer wall of the body, an inner wall of the first piston includes a first area and a second area, the body is disposed in correspondence with the first area, the limiting part is disposed in correspondence with the second area, and the limiting part abuts against an end part of the first area. The permanent magnet is usually fixed with the structure sleeve in a form of injection molding, interference fit, or the like, and the structure sleeve and the permanent magnet form a magnet assembly. An inner diameter of the first area is smaller than an inner diameter of the second area. In this way, when the magnet assembly is installed inside the first piston, the limiting part abuts against the end part of the first area to limit a position of the magnet assembly in the first piston, so that the magnet assembly is installed at a preset position, to prevent a problem that the distance between the travel sensor and the permanent magnet is increased when the magnet assembly is installed in a misplaced manner, which affects the magnetic field at the travel sensor, and is not conducive to improving signal precision of the travel sensor.

In a possible implementation, the braking apparatus includes an anti-rotation mechanism, and the anti-rotation mechanism is configured to prevent the permanent magnet from rotating in a circumferential direction of the permanent magnet. If the permanent magnet still rotates in the circumferential direction when the permanent magnet moves linearly relative to the sensing element, consistency between a magnetic deflection angle of the travel sensor and a magnetic deflection angle of the travel sensor in a calibration state is changed, thereby affecting signal precision of the sensor. In this implementation of this disclosure, the anti-rotation mechanism is disposed to prevent the permanent magnet from rotating in the circumferential direction of the permanent magnet. This helps improve detection precision of the travel sensor.

In a possible implementation, the anti-rotation mechanism includes an anti-rotation groove and an anti-rotation rib, the master cylinder part includes a first piston, the permanent magnet and the structure sleeve are both located inside the first piston, the anti-rotation groove is located in the structure sleeve, the anti-rotation rib is located on an inner wall of the first piston, and the anti-rotation rib is clamped into the anti-rotation groove. The sensing element of the travel sensor determines a linear travel position of the permanent magnet based on a sensed magnetic field angle change. However, in a process of magnetizing, the permanent magnet inevitably has a magnetic deflection angle relative to an axis, which is generally within 5 degrees (°). If the permanent magnet moves linearly relative to the sensing element, and also rotates in the circumferential direction, the consistency between the magnetic deflection angle of the travel sensor and the magnetic deflection angle of the travel sensor in the calibration state is changed, thereby affecting the signal precision of the sensor. In this disclosure, both the permanent magnet and the structure sleeve are coaxially disposed with the first piston. In this implementation of this disclosure, the anti-rotation rib is clamped into the anti-rotation groove, to prevent the structure sleeve from rotating in a circumferential direction of the structure sleeve in the first piston, that is, prevent the permanent magnet from rotating in a circumferential direction of the permanent magnet in the first piston. This helps improve measurement precision, and ensures consistency of measurement precision in a plurality of times of back-and-forth movement. A structure in which the anti-rotation groove and the anti-rotation rib cooperate is disposed, so that in a process of installing the structure sleeve on the first piston, initial positioning and installation can be implemented provided that the anti-rotation rib is clamped into the anti-rotation groove, to improve installation efficiency. In addition, a travel measurement error caused by uneven magnetization of the permanent magnet can also be avoided.

It should be noted that the anti-rotation rib and the anti-rotation groove are merely an implementation of preventing the magnet assembly from rotating in a circumferential direction of the magnet assembly in the first piston, and there is another design structure of a combination of the anti-rotation rib and the anti-rotation groove. In some implementations, an anti-rotation design form such as interference fit, a snap, crimping, and glue filling may alternatively be used.

In some possible implementations, the structure sleeve and the first piston may be noncoaxially disposed, and the structure sleeve is disposed on one side of the travel sensor. Alternatively, the permanent magnet and the structure sleeve may be noncoaxially disposed, and the permanent magnet is disposed on one side of the travel sensor. In this way, the distance from the permanent magnet to the travel sensor is reduced, and signal precision of the travel sensor is improved.

In the magnet assembly, the permanent magnet is usually fixed with the structure sleeve in a form of injection molding, interference fit, or the like, to ensure that the permanent magnet does not rotate relative to the structure sleeve. In addition, the first piston and the hydraulic block also have a similar anti-rotation structure directly or indirectly. To be specific, there are anti-rotation constraints between the permanent magnet and the structure sleeve, between the structure sleeve and the first piston, and between the first piston and the hydraulic block directly or indirectly, to ensure that in a process in which the push rod pushes the first piston and the permanent magnet to move back and forth, the magnetic deflection angle of the permanent magnet is always consistent with that of the sensing element, that is, ensure precision consistency of the travel sensor.

In a possible implementation, the braking apparatus includes a solenoid valve, the solenoid valve is located in the control unit, the solenoid valve is disposed away from the travel sensor, and the solenoid valve is electrically connected to a control substrate of the control unit. There is a plurality of hydraulic pipelines inside the hydraulic block, and the solenoid valve is used to control opening and closing of the pipelines inside the hydraulic block. When the solenoid valve works, a strong electromagnetic field is generated, and magnetic leakage interferes with the magnetic field signal transmitted by the permanent magnet to the sensing element. Consequently, precision of an output signal of the travel sensor is affected. In this implementation of this disclosure, a value of a safety distance is set based on a straight-line distance from the solenoid valve to the sensing element. This helps avoid impact of the solenoid valve on the sensing element, and improves signal precision of the travel sensor. A value of the safety distance is obtained through magnetic leakage simulation analysis of the solenoid valve and precision simulation analysis of the sensing element. That is, the solenoid valve is disposed away from the sensing element of the travel sensor, and is further disposed as required.

According to a second aspect, an embodiment of this disclosure provides a braking system. The braking system includes a wheel braking loop, a wheel brake, and the braking apparatus according to any one of the first aspect. The wheel braking loop is connected to the hydraulic block and the wheel brake. In a working process of the braking system, the wheel braking loop supplies a hydraulic pressure brake fluid to the wheel brake under joint modulation of the hydraulic block and the control unit, to implement braking of a vehicle, and finally implement precise control of a speed of the vehicle. The wheel brake may be a disc brake, a drum brake, or the like. This is not limited in this disclosure.

According to a third aspect, an embodiment of this disclosure provides a vehicle, including a wheel and the braking system according to the third aspect. The wheel brake is installed on the wheel. The braking system controls the wheel to implement braking of the vehicle. The vehicle may be a gasoline vehicle or an electric vehicle, for example, a pure electric vehicle, an extended-range electric vehicle, a hybrid electric vehicle, a fuel cell vehicle, or a new energy vehicle. This is not limited in this disclosure.

In addition, an embodiment of this disclosure provides an installation method of a braking apparatus. The method includes manufacturing a hydraulic block, where the hydraulic block is provided with a first groove and a second groove, manufacturing a master cylinder part, where a part of the master cylinder part is disposed in the second groove and is slidingly connected to the hydraulic block, the second groove extends in a first direction, the master cylinder part moves back and forth in the first direction, and the master cylinder part is internally provided with a permanent magnet, and manufacturing a travel sensor, where the travel sensor is disposed in the first groove and is fixedly connected to the hydraulic block, and the travel sensor is disposed on a periphery of the permanent magnet, and is configured to detect a movement amount of the permanent magnet.

In this disclosure, a dimension chain between the permanent magnet and the travel sensor is reduced and signal precision of the travel sensor is improved through a reasonable layout of the permanent magnet and the travel sensor. The braking apparatus in this disclosure has a simple structure. This greatly simplifies actual assembly complexity. The permanent magnet is disposed in a first piston of the master cylinder part, the master cylinder part is installed on the hydraulic block, and the travel sensor is fixed on the hydraulic block, so that assembly time is short, assembly efficiency is high, an assembly yield rate is high, and the costs are low. This is conducive to industrialization of the braking apparatus. Both the travel sensor and the first piston of the master cylinder part are directly disposed on the hydraulic block. This reduces the dimension chain between the travel sensor and the permanent magnet, and helps improve signal precision of the travel sensor.

In a possible implementation, a control unit is manufactured, the control unit and the hydraulic block are disposed in a stacked manner, an opening of the first groove faces the control unit, the first groove communicates with an internal space of the control unit, and the travel sensor extends into the internal space of the control unit, to implement sealing of the travel sensor. After the master cylinder part is installed on the hydraulic block, and the travel sensor is fixed on the hydraulic block, the control unit is directly assembled and fixed with the hydraulic block through guide tooling, so that overall sealing and electric contact may be implemented. A part of the travel sensor extends into the first groove and is disposed adjacent to the permanent magnet, and the other part of the travel sensor extends into the internal space of the control unit and is configured to be electrically connected to a control substrate of the control unit. The hydraulic block and the control unit jointly perform a sealing function on the travel sensor, to prevent dust or water from an external environment from entering the travel sensor and affecting performance of the travel sensor. The travel sensor is always in a sealed environment formed by the hydraulic block and the control unit, and does not need to perform sealing protection (where for example, a side that is of a housing of the travel sensor and that faces the permanent magnet may be provided with an opening, and the housing does not completely isolate a sensing substrate and a sensing element from the outside), so that costs are reduced. In addition, the sensing substrate and the sensing element in the travel sensor do not need to be sealed for protection. This also reduces a volume of the travel sensor, saves an internal space of the braking apparatus, and further reduces a distance from the travel sensor to the permanent magnet.

In this disclosure, the dimension chain between the permanent magnet and the travel sensor is reduced through a reasonable layout of the permanent magnet and the travel sensor. This helps improve signal precision of the travel sensor. In addition, the travel sensor is disposed close to the permanent magnet, to reduce a gap between the permanent magnet and the travel sensor as much as possible. This effectively improves signal precision of the travel sensor.

BRIEF DESCRIPTION OF DRAWINGS

To describe technical solutions in some embodiments of the present disclosure more clearly, the following describes accompanying drawings that are to be used in some embodiments of the present disclosure.

DESCRIPTION OF EMBODIMENTS

The following clearly and completely describes technical solutions in embodiments of this disclosure with reference to accompanying drawings in embodiments of this disclosure. It is clear that the described embodiments are some but not all of embodiments of this disclosure. All other embodiments obtained by a person of ordinary skill in the art based on embodiments of this disclosure without creative efforts shall fall within the protection scope of this disclosure.

Figure 1:
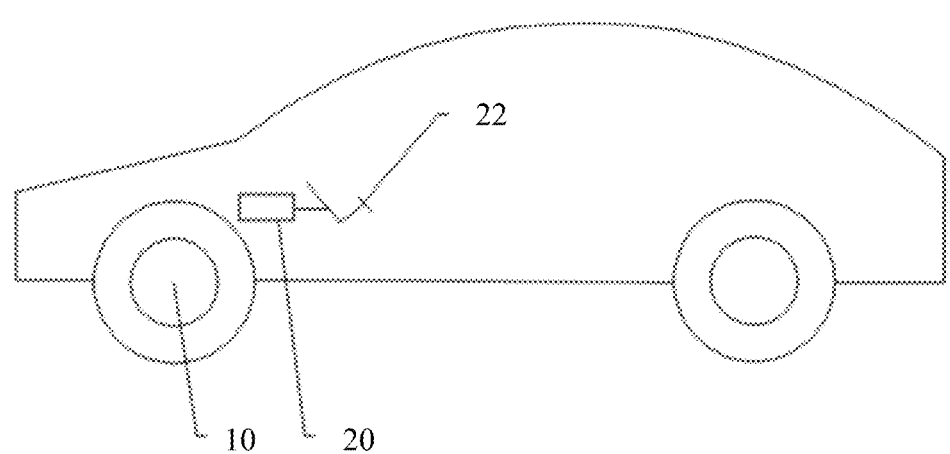
FIG. 1 is a schematic diagram of a structure of a vehicle according to an implementation of this disclosure.
Figure 2:
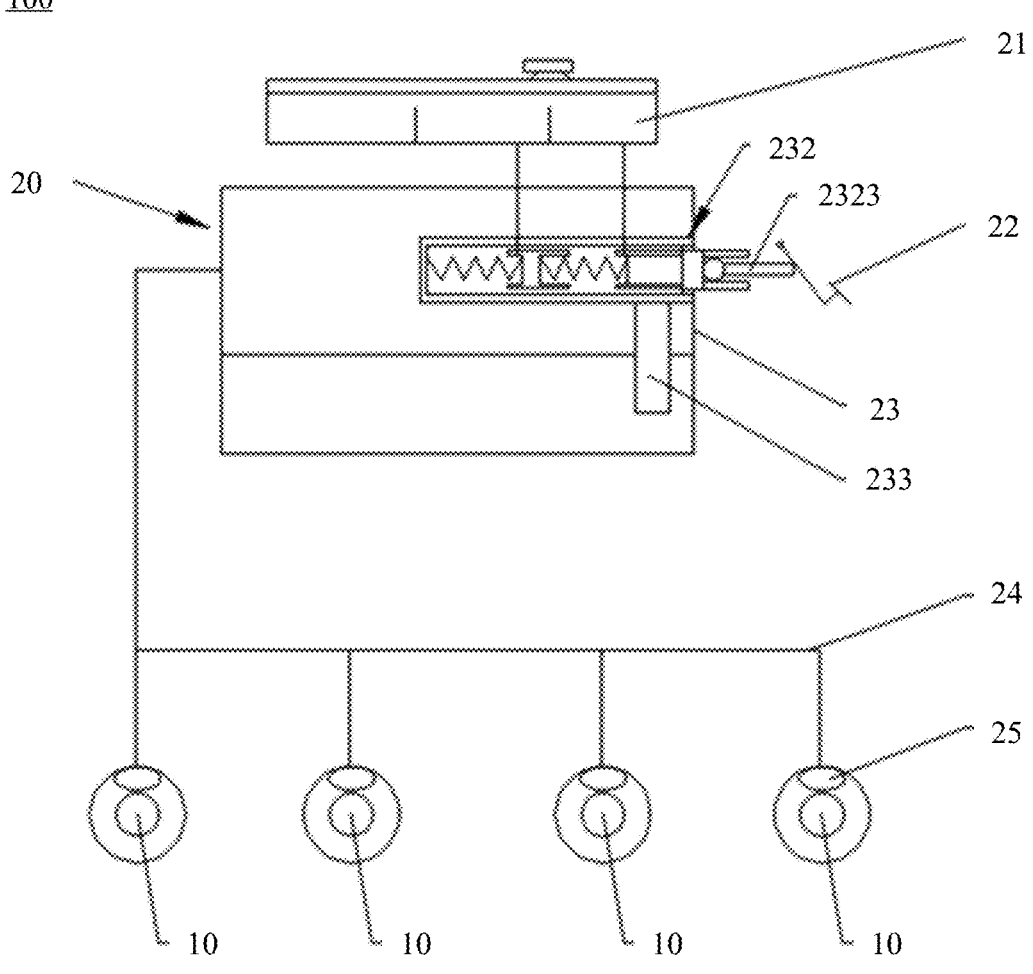
FIG. 2 is a schematic diagram of a structure of a braking system inside a vehicle according to an implementation of this disclosure.

As shown in FIG. 1 and FIG. 2, FIG. 1 is a schematic diagram of a possible structure of a vehicle 100 according to an embodiment of this disclosure, and FIG. 2 is a schematic diagram of a possible structure of a braking system 20 inside the vehicle 100. The vehicle 100 may be a gasoline vehicle or an electric vehicle, for example, a pure electric vehicle, an extended-range electric vehicle, a hybrid electric vehicle, a fuel cell vehicle, or a new energy vehicle. This is not limited in this disclosure. The vehicle 100 includes a wheel 10 and a braking system 20. The braking system 20 controls movement of the wheel 10 to implement braking of the vehicle 100.

A braking apparatus provided in embodiments of this disclosure may be applied to the braking system. In a possible implementation, the braking system 20 includes an oil can 21, a brake pedal 22, a braking apparatus 23, a wheel braking loop 24, and a wheel brake 25. The oil can 21 is connected to a pipeline in the braking apparatus 23, the brake pedal 22 is connected to a push rod of the braking apparatus 23, and the wheel braking loop 24 is connected to a hydraulic block of the braking apparatus 23 and the wheel brake 25. In a braking process, the wheel brake 25 acts on the wheel 10. The oil can 21 provides a brake fluid to the braking apparatus 23. When a driver steps on the brake pedal 22, the braking apparatus 23 starts to work. The wheel braking loop 24 supplies a brake fluid with precise hydraulic pressure to the wheel brake 25 under joint modulation of the hydraulic block and a control unit of the braking apparatus 23. The wheel brake 25 controls movement of the wheel 10 to implement braking of the vehicle 100, and finally control a speed of the vehicle 100. In some possible implementations, the wheel brake may be a disc brake, a drum brake, or the like. This is not limited in this disclosure.

The braking apparatus 23 in embodiments of this disclosure not only may be applied to the braking system 20 shown in FIG. 2, but also may be applied to another electrohydraulic braking system. In embodiments of this disclosure, a travel sensor of the braking apparatus 23 may alternatively be applied to another linear travel detection field.

Figure 3:
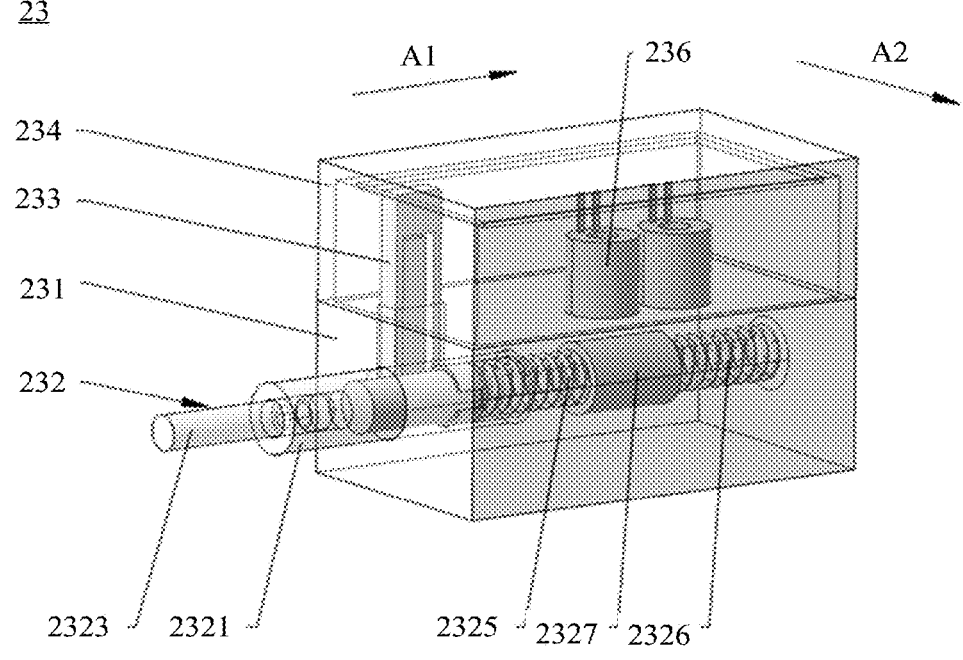
FIG. 3 is a schematic diagram of a structure of a braking apparatus according to an implementation of this disclosure.
Figure 4:
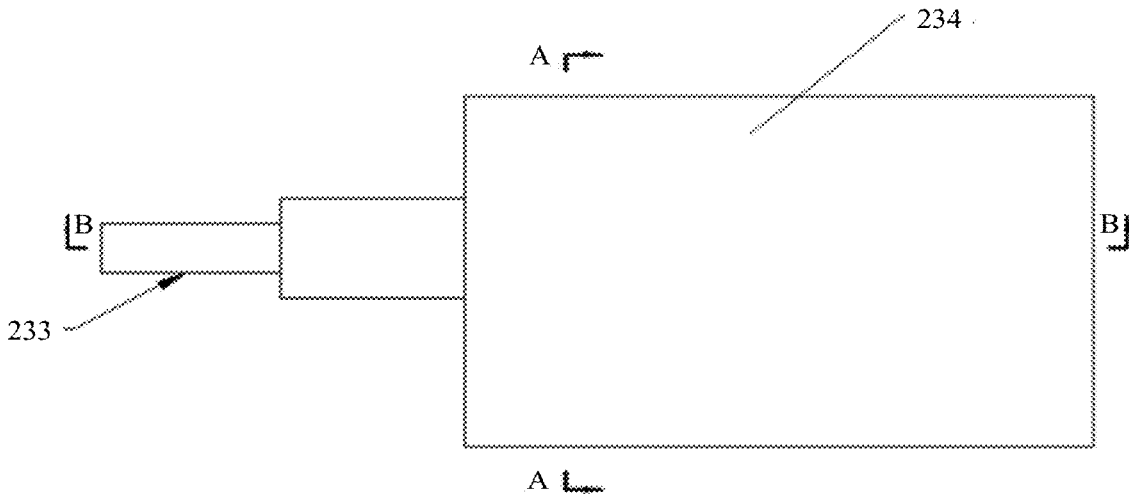
FIG. 4 is a top view of the braking apparatus shown in FIG. 3.
Figure 5:
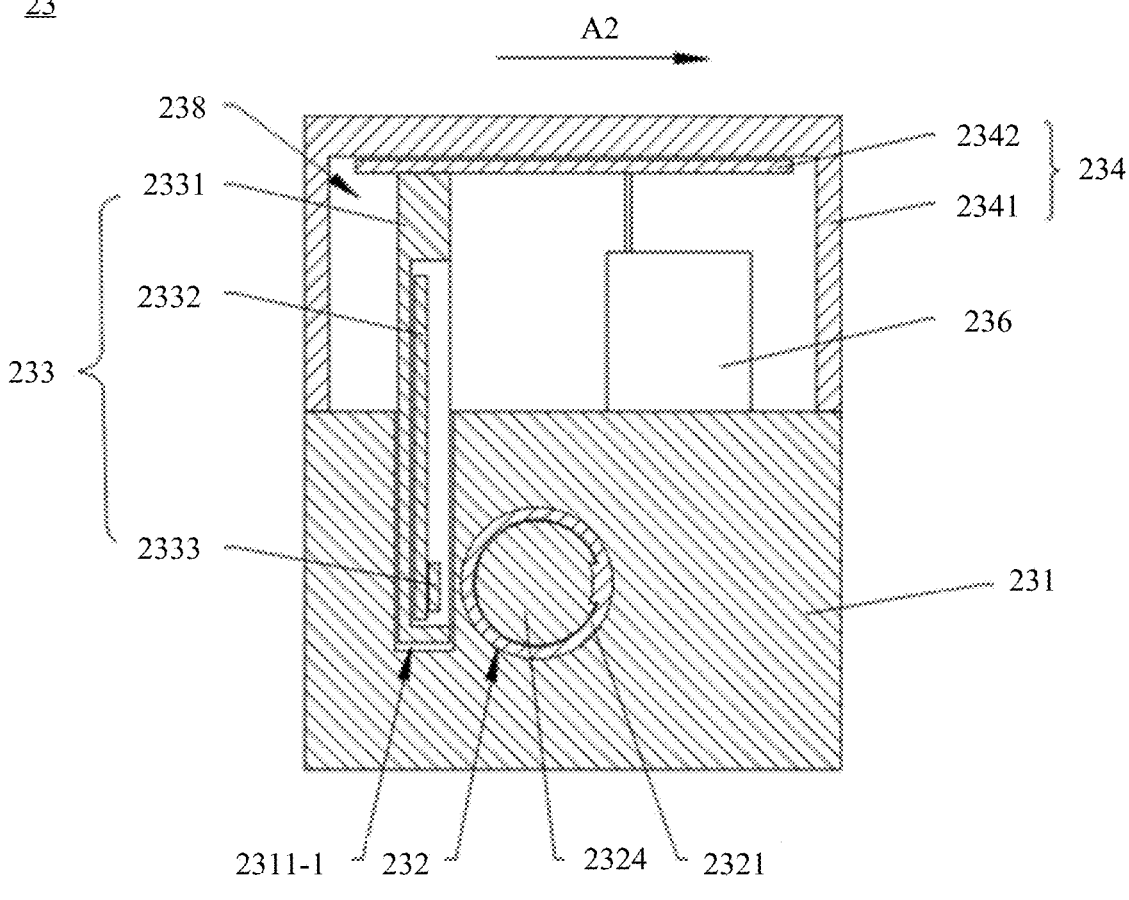
FIG. 5 is a sectional view of the braking apparatus shown in FIG. 4 along A-A.

As shown in FIG. 3, FIG. 4, and FIG. 5, FIG. 3 is a schematic diagram of a possible structure of the braking apparatus 23, FIG. 4 is a top view of the braking apparatus 23 shown in FIG. 3, and FIG. 5 is a sectional view of the braking apparatus 23 shown in FIG. 4 along A-A. The braking apparatus 23 includes a hydraulic block 231, a master cylinder part 232, and a travel sensor 233 (also shown in FIG. 2). The hydraulic block 231 is configured to accommodate a brake fluid. For example, the hydraulic block 231 is internally provided with a pipeline, and there is the brake fluid in the pipeline. The master cylinder part 232 is installed on the hydraulic block 231, and the travel sensor 233 is installed on the hydraulic block 231. In some possible implementations, the master cylinder part 232 includes a push rod 2323 (as shown in FIG. 2), a first piston 2321, a first elastic component 2325, a second piston 2327, and a second elastic component 2326. The master cylinder part 232 is configured to compress the brake fluid, so that the brake fluid obtains precise hydraulic pressure.

Figure 6:
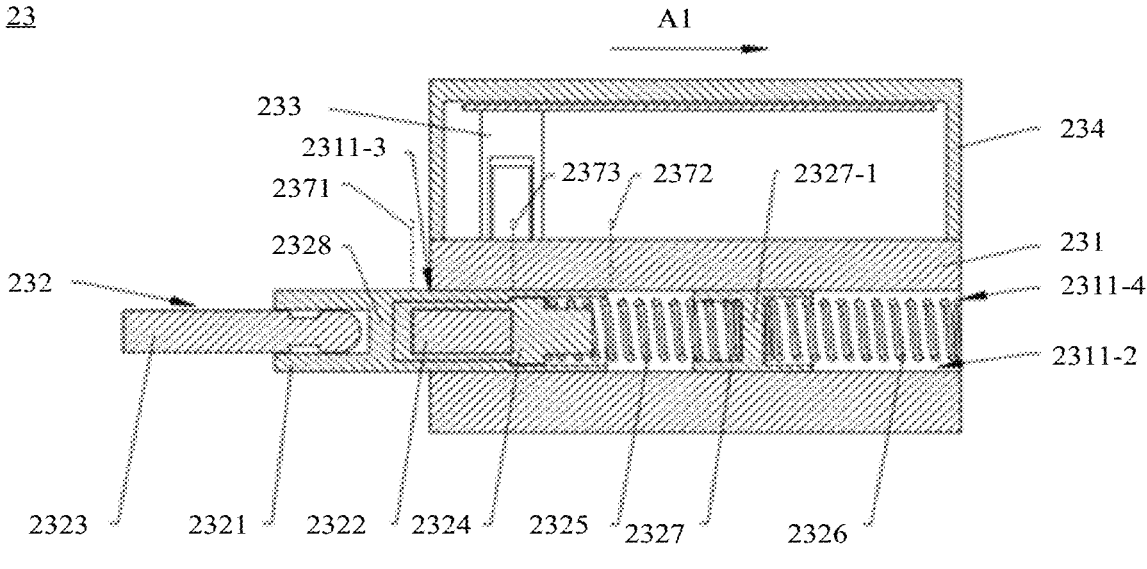
FIG. 6 is a sectional view of the braking apparatus shown in FIG. 4 along B-B.

As shown in FIG. 5 and FIG. 6, FIG. 6 is a sectional view of the braking apparatus 23 shown in FIG. 4 along B-B. The hydraulic block 231 is provided with a first groove 2311-1 and a second groove 2311-2. The travel sensor 233 is located in the first groove 2311-1 and is fixedly connected to the hydraulic block 231. A fixing manner between the travel sensor 233 and the hydraulic block 231 may be fixing through a screw, fixing through a snap, fixing through interference fit, or fixing through crimping, or the like. This is not limited in this disclosure. The second groove 2311-2 extends in a first direction A1, and the master cylinder part 232 is located in the second groove 2311-2 and is in sliding contact with the second groove 2311-2. It may also be understood as that the master cylinder part 232 is slidingly connected to the hydraulic block 231. The sliding connection herein means that the master cylinder part 232 can move back and forth in the first direction A1. In this implementation of this disclosure, the first groove 2311-1 and the second groove 2311-2 are sealed and isolated, that is, a space of the first groove 2311-1 does not communicate with a space of the second groove 2311-2, to prevent the brake fluid in the second groove 2311-2 from flowing to the first groove 2311-1, and affecting performance of the braking apparatus 23. It should be noted that, in an implementation of this disclosure, shapes of the first groove 2311-1 and the second groove 2311-2 are not limited, and the first groove 2311-1 and the second groove 2311-2 may be circles, squares, or other shapes.

The master cylinder part 232 includes the first piston 2321, and the first piston 2321 is located in the second groove 2311-2 and is slidingly connected to the hydraulic block 231. In a possible implementation, the first piston 2321 is internally provided with a permanent magnet 2322, that is, the master cylinder part 232 is internally provided with the permanent magnet 2322. The first piston 2321 may move back and forth in the first direction A1, and the permanent magnet 2322 may move back and forth in the first direction A1 with the first piston 2321. The permanent magnet 2322 and the first piston 2321 remain relatively static. The travel sensor 233 is disposed on a periphery of the permanent magnet 2322, and the travel sensor 233 and the first groove 2311-1 are disposed close to the permanent magnet 2322. It should be noted that, disposing the travel sensor 233 close to the permanent magnet 2322 can improve precision of travel measurement, and help control a braking system more precisely. However, the travel sensor 233 is disposed outside the permanent magnet 2322 and does not communicate with the permanent magnet 2322, so that a risk of contacting the brake fluid by the travel sensor 233 can be reduced, normal working of the travel sensor 233 can be ensured, and a service life can be extended.

The hydraulic block 231 is provided with the pipeline, and there is the brake fluid in the pipeline. The pipeline is configured to transmit the brake fluid. The master cylinder part 232 is connected to the brake pedal 22. An operation force applied at the brake pedal 22 is transferred to the brake fluid in the hydraulic block 231 through the master cylinder part 232. In a process of applying the operation force at the brake pedal 22, the travel sensor 233 is configured to detect a movement amount of the permanent magnet 2322 to determine a movement amount of the first piston 2321, that is, is configured to detect a travel of the permanent magnet 2322 and the first piston 2321 relative to the hydraulic block 231, output an electrical signal, and finally drive a brake unit, to implement precise control of a speed of the vehicle 100.

In this disclosure, signal precision of the travel sensor 233 is improved through a reasonable layout of the permanent magnet 2322 and the travel sensor 233. The permanent magnet 2322 is disposed inside the first piston 2321, and there is no need to dispose, on the hydraulic block 231, a hole part for installing the permanent magnet 2322. This simplifies a structure and an assembly process of the hydraulic block 231, provides more spaces for arranging the pipeline in the hydraulic block 231, and further reduces a dimension chain between the permanent magnet 2322 and the travel sensor 233. The dimension chain between the permanent magnet 2322 and the travel sensor 233 herein may be understood as tolerance accumulation between the permanent magnet 2322 and the travel sensor 233. This helps simplify an installation method of the braking apparatus 23, improves installation precision of the braking apparatus 23, and also improves travel detection precision of the braking apparatus 23. The travel sensor 233 is installed in the first groove 2311-1, located on one side of the master cylinder part 232, and disposed close to the permanent magnet 2322. For example, in a possible implementation, the travel sensor 233 may be directly fixed on the hydraulic block 231. In this disposing manner, the dimension chain between the travel sensor 233 and the permanent magnet 2322 is reduced. This helps improve precision of travel measurement performed by the travel sensor 233. In the implementation of this disclosure, the travel sensor 233 is disposed close to the permanent magnet 2322, to reduce a gap between the permanent magnet 2322 and the travel sensor 233 as much as possible. This effectively improves signal precision of the travel sensor 233.

In a possible implementation, a second direction A2 is perpendicular to the first direction A1, the second direction A2 is also an arrangement direction of the master cylinder part 232 and the travel sensor 233, and the permanent magnet 2322 moves back and forth between a first position 2371 and a second position 2372. In a possible implementation, that the permanent magnet 2322 moves back and forth between a first position 2371 and a second position 2372 may be understood as following. When the brake pedal is not stepped on, the first elastic component 2325 is in a natural state, and in this case, the permanent magnet 2322 is located at a leftmost end 2371 shown in FIG. 6. When the braking pedal is stepped on to a maximum travel, that is, when a compression amount of the first elastic component 2325 is maximum, the permanent magnet 2322 is located at a rightmost end 2372 shown in FIG. 6. Vertical projection of a central position 2373 between the first position 2371 and the second position 2372 in the second direction A2 is located on the travel sensor 233. This helps improve precision of travel measurement, and simplifies a calibration process. It should be noted that the projection of the central position 2373 may not be located on the travel sensor 233, which may be determined based on an actual design requirement. The first position 2371, the second position 2372, and the central position 2373 may be understood as a point, or may be understood as a line. In other words, the travel sensor 233 directly faces the central position 2373 in the second direction A2. That is, the first position 2371 and the second position 2372 are symmetrical with respect to the travel sensor 233. Directly facing may be understood as that a connection line between the central position 2373 and a point on the travel sensor 233 is parallel to the second direction A2. In this implementation, the central position 2373 is set to be vertically projected on the travel sensor 233 in the second direction A2, so that a distance between the permanent magnet 2322 and the travel sensor 233 is not excessively large when the permanent magnet 2322 moves back and forth. In this way, the travel sensor 233 can detect sufficient magnetic field strength. This helps improve signal precision of the travel sensor 233.

In some other implementations, the vertical projection of the central position 2373 in the second direction A2 may alternatively not be on the travel sensor 233, that is, the first position 2371 and the second position 2372 are asymmetric with respect to the travel sensor 233. In this way, signal precision of the travel sensor 233 can be ensured provided that a travel interval with high magnetic field strength is selected.

Refer to FIG. 5. The travel sensor 233 includes a housing 2331, a sensing substrate 2332, and a sensing element 2333. The sensing substrate 2332 is fixed inside the housing 2331, the sensing element 2333 is fixed on the sensing substrate 2332 and is electrically connected to the sensing substrate 2332, and the sensing element 2333 is located on a side that is of the sensing substrate 2332 and that is close to the master cylinder part 232. In a possible implementation, the sensing element 2333 may be electrically connected to the sensing substrate 2332 in a tin soldering manner. A part of the housing 2331 extends into the first groove 2311-1 and is fixed on the hydraulic block 231. The sensing element 2333 is located in the first groove 2311-1 and is disposed close to the permanent magnet 2322. A distance between the sensing element 2333 and the permanent magnet 2322 is less than a threshold. For example, the distance between the sensing element 2333 and the permanent magnet 2322 is less than 10 mm. In this way, the sensing element 2333 can sense a magnetic field with specific magnetic induction strength, and can meet a requirement for sealing and isolation. For example, the distance between the sensing element 2333 and the permanent magnet 2322 may be 8 mm, which may be obtained through an experiment or simulation. Simulation is used as an example. The distance between the sensing element and the permanent magnet is related to a dimension of the first piston, a distance between the first groove and the second groove, and the like. These pieces of data are input into a simulation model, so that magnetic induction strength, of the permanent magnet, that can be sensed by the sensing element and that is greater than 10 mT is obtained, and the requirement for sealing and isolation can be ensured.

To improve signal precision of the travel sensor 233, the distance between the first groove 2311-1 and the second groove 2311-2 is controlled within a small enough range. For example, the distance between the first groove 2311-1 and the second groove 2311-2 is greater than 1.5 mm and less than 2 mm, or the distance between the first groove 2311-1 and the second groove 2311-2 is less than 1.5 mm. In this case, the hydraulic block between the first groove 2311-1 and the second groove 2311-2 is excessively thin, and consequently the brake fluid leaks. The distance between the first groove 2311-1 and the second groove 2311-2 is greater than 2 mm. In this case, the magnetic induction strength, of the permanent magnet 2322, that can be detected by the travel sensor 233 is weak. That is, a distance between the travel sensor 233 and the master cylinder part 232 is controlled within a small enough range.

In addition, it should be noted that the pipeline in the hydraulic block 231 is arranged in the hydraulic block 231 to avoid an area between the first groove 2311-1 and the second groove 2311-2, that is, the pipeline in the hydraulic block 231 is not disposed between the first groove 2311-1 and the second groove 2311-2. Refer to FIG. 6. In the first direction A1, the pipeline may be arranged on two sides of the travel sensor 233 instead of being arranged in an area corresponding to the travel sensor 233. A gap between the first groove 2311-1 and the second groove 2311-2 is small, and no pipeline or other structure is disposed. In this way, it can be ensured that a distance between the travel sensor 233 and the permanent magnet 2322 is small. This helps improve signal precision of the travel sensor 233, and also avoids impact of the pipeline on a signal received by the travel sensor. In a possible implementation, the hydraulic block between the first groove and the second groove meet a minimum requirement for sealing and isolation, to ensure that the distance between the travel sensor and the permanent magnet is as small as possible.

In a possible implementation, the sensing element 2333 may be a Hall element, or may be another element. In a working process of the braking apparatus 23, the first piston 2321 and the permanent magnet 2322 inside the first piston 2321 move back and forth, and a magnetic field at the sensing element 2333 changes. The sensing element 2333 obtains a movement amount of the permanent magnet 2322 based on the change of the magnetic field, determines a movement amount of the first piston 2321, and transmits the movement amount to a control unit in a form of an electrical signal. If the distance between the sensing element 2333 and the permanent magnet 2322 is excessively large, the magnetic field strength at the sensing element 2333 is weak. In this way, when a magnetic field changes, it is difficult for the sensing element 2333 to precisely sense a change amount of the magnetic field, and consequently signal precision of the travel sensor 233 is affected. In this implementation, the sensing element 2333 is disposed close to the permanent magnet 2322. This helps ensure signal precision of the travel sensor 233.

In some possible implementations, refer to FIG. 3 and FIG. 5. The braking apparatus 23 is provided with a control unit 234, the control unit 234 includes a housing 2341 and a control substrate 2342, and the control substrate 2342 is fixed inside the housing 2341. The control unit 234 and the hydraulic block 231 are disposed in a stacked manner, and the control unit 234 is fixed on the hydraulic block 231. In a possible implementation, a fixing manner between the control unit 234 and the hydraulic block 231 may be fixing through a screw, fixing through a bolt, or the like. A specific connection structure is not shown. This is not limited in this disclosure. It should be noted that, in a possible implementation, the control unit 234 and the hydraulic block 231 are connected in a sealed manner, that is, the travel sensor 233 is not affected by dust, water vapor, or the like outside the braking apparatus in a sealed space of a travel between the control unit 234 and the hydraulic block 231.

Refer to FIG. 5. An opening of the first groove 2311-1 faces the control unit 234, the first groove 2311-1 communicates with an internal space of the control unit 234, and the travel sensor 233 extends into the internal space of the control unit 234, to implement sealing of the travel sensor 233. In other words, a part of the travel sensor 233 extends into the first groove 2311-1 and is disposed adjacent to the permanent magnet 2322, and the other part of the travel sensor 233 extends into the internal space of the control unit 234 and is configured to be electrically connected to the control substrate 2342. It may also be understood as that the hydraulic block 231 and the control unit 234 form a closed accommodation space 238, and the travel sensor 233 is located in the accommodation space 238. The hydraulic block 231 and the control unit 234 jointly perform a sealing function on the travel sensor 233, to prevent dust or water from an external environment from entering the travel sensor 233, and affecting performance of the travel sensor 233. The travel sensor 233 is always in a sealed environment formed by the hydraulic block 231 and the control unit 234, and does not need to perform sealing protection (where for example, a side that is of the housing 2331 of the travel sensor 233 and that faces the master cylinder part 232 may be provided with an opening, and the housing 2311 does not completely isolate the sensing substrate 2332 and the sensing element 2333 from the outside, but performs a sealing protection function on the sensing substrate 2332 and the sensing element 2333 through the hydraulic block 231 and the control unit 234), so that costs are reduced. In addition, the sensing substrate 2332 and the sensing element 2333 in the travel sensor 233 do not need to be sealed for protection. This also reduces a volume of the travel sensor 233, saves an internal space of the braking apparatus 23, and reduces the distance from the travel sensor 233 to the permanent magnet 2322.

Figure 7:
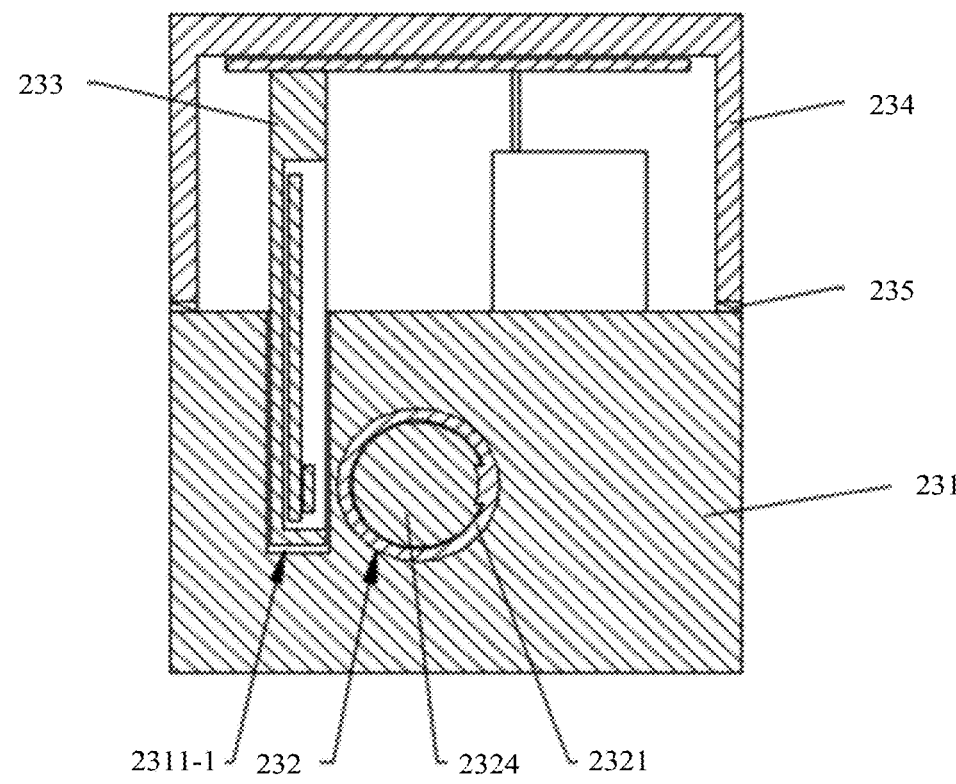
FIG. 7 is a schematic diagram of a structure of a braking apparatus according to an implementation of this disclosure.

In some implementations, FIG. 7 is a schematic diagram of a structure of the braking apparatus 23. The braking apparatus 23 is provided with a sealing structure 235, and the sealing structure 235 is located between the control unit 234 and the hydraulic block 231, and is for the connection between the control unit 234 and the hydraulic block 231 in a sealed manner, so that the travel sensor 233 is located in the sealed environment formed by the control unit 234 and the hydraulic block 231, to prevent dust, water, or the like from an external environment from entering the travel sensor 233, and affecting performance of the travel sensor 233. The control unit 234 and the hydraulic block 231 are connected in a sealed manner, so that the travel sensor 233 is sealed, and the control unit 234 isolates the travel sensor 233 from the external environment. In this way, the travel sensor 233 is always in the sealed environment formed by the hydraulic block 231 and the control unit 234, and does not need to perform sealing protection, so that costs are reduced.

For example, the sealing structure 235 may be a sealing ring, and the sealing ring seals the hydraulic block 231 and the control unit 234 that are disposed in a stacked manner, so that a strict waterproof and dustproof level may be achieved, thereby helping protect a structure inside the control unit 234 and the travel sensor 233. In some implementations, the sealing structure 235 may alternatively be rubber, and sealing between the hydraulic block 231 and the control unit 234 may be implemented by coating rubber.

In a possible implementation provided in this disclosure, the travel sensor 233 and the control unit 234 are of a split structure, the travel sensor 233 is directly fixed on the hydraulic block 231, and the control unit 234 is also directly fixed on the hydraulic block 231, so that a quantity of dimension chains between the travel sensor 233 and the control substrate 2342 of the control unit 234 is small and the dimension chain is easy to assemble. An electrical connection between the travel sensor 233 and the control substrate 2342 can implement good electrical contact by using control of a component dimension and an assembly process, and there is a sufficient design dimension margin for the electrical contact (which may be understood as that a contact area of the electrical connection between the travel sensor 233 and the control substrate 2342 may be designed to be small, to implement a good electrical connection, or a contact area remains unchanged, and a good electrical connection can be implemented even if there is some misplacement). In this way, requirements on the component size and the assembly process may be reduced, thereby helping reduce costs and improve an assembly yield rate. In addition, the travel sensor 233 is directly fixed on the hydraulic block 231, so that a quantity of dimension chains between the travel sensor 233 and the permanent magnet 2322 is small. This helps improve signal precision of the travel sensor 233. In addition, the quantity of dimension chains between the travel sensor 233 and the permanent magnet 2322 is small, so that a processing process and time are reduced. This helps reduce the costs and also helps improve the assembly yield rate.

In some possible implementations, the electrical connection between the travel sensor 233 and the control substrate 2342 may be a connector clip, spring contact, metal pad contact, or the like. This is not limited in this disclosure.

In some possible implementations, refer to FIG. 3 and FIG. 6, the master cylinder part 232 is further provided with the push rod 2323, the first elastic component 2325, the second elastic component 2326, and the second piston 2327. The first piston 2321 is internally provided with a first separator 2328, and the push rod 2323 extends into the first piston 2321. In a possible implementation, in a working process of the braking apparatus 23, the push rod 2323 abuts against the first separator 2328 to push the first piston 2321 to move. The first separator 2328 and the first piston 2321 may be of an integrated structure, and the structure is simple, which avoids a process of assembling. The first separator 2328 and the first piston 2321 may alternatively be of a split structure. In the split structure, the first separator 2328 may be installed in the first piston 2321 through interference fit, and it is ensured that the first piston 2321 is isolated into two spaces that are not in communication.

Figure 8:
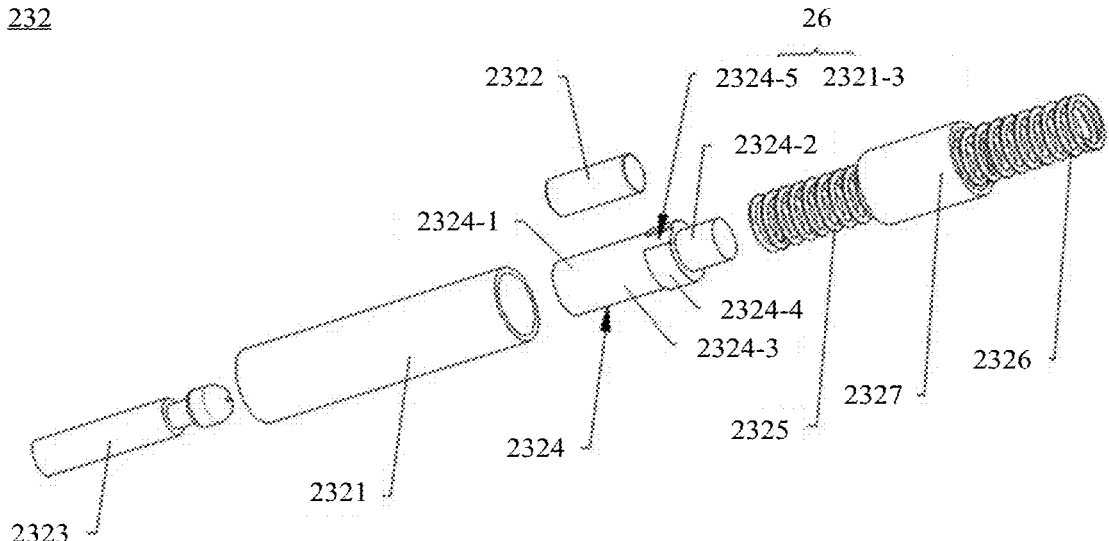
FIG. 8 is a schematic exploded diagram of a structure of a master cylinder part according to an implementation of this disclosure.

FIG. 8 is a schematic exploded diagram of a partial structure of the master cylinder part 232. The braking apparatus 23 is provided with a structure sleeve 2324, the structure sleeve 2324 wraps the permanent magnet 2322, and the structure sleeve 2324 and the permanent magnet 2322 form a magnet assembly. In a possible implementation, both the structure sleeve 2324 and the permanent magnet 2322 are located inside the first piston 2321, and the structure sleeve 2324 and the first piston 2321 are in interference fit. Neither the structure sleeve 2324 nor the permanent magnet 2322 can move in the first piston 2321. The structure sleeve 2324 and the permanent magnet 2322 may move back and forth in the first direction A1 with the first piston 2321.

In a possible implementation, the permanent magnet 2322 may be made of neodymium iron boron, or may be made of another material. There may be one or more permanent magnets 2322. In a case of a plurality of permanent magnets 2322, all the permanent magnets 2322 may be coaxially disposed in the structure sleeve 2324. In some possible implementations, the permanent magnet 2322 may be a cylinder, or may be a special-shaped structure such as a semi-cylinder.

Some structures of the master cylinder part 232 are usually made of ferromagnetic materials, for example, the push rod 2323, the first elastic component 2325, and the second elastic component 2326. The first elastic component 2325 and the second elastic component 2326 cooperate with the permanent magnet 2322. The push rod 2323 cooperates with the first piston 2321, and is used for back-and-forth movement of the first piston 2321 and the permanent magnet 2322. The structures made of these ferromagnetic materials change a magnetic field of the permanent magnet 2322, affect a signal received by the travel sensor 233, and are not conducive to improving signal precision of the travel sensor 233. In this embodiment of this disclosure, the structure sleeve 2324 may be disposed as being made of a non-ferromagnetic material (for example, may be made of plastic, aluminum, or the like), and the structure sleeve 2324 made of the non-ferromagnetic material wraps the permanent magnet 2322, that is, the permanent magnet 2322 is isolated from the ferromagnetic materials such as the push rod 2323, the first elastic component 2325, and the second elastic component 2326 by disposing the structure sleeve 2324, to avoid impact of the ferromagnetic materials such as the push rod 2323, the first elastic component 2325, and the second elastic component 2326 on the magnetic field of the permanent magnet 2322, and improve signal precision of the travel sensor 233.

In some possible implementations, distances between the permanent magnet 2322 and the first elastic component 2325 and the second elastic component 2326 and a distance between the permanent magnet 2322 and the push rod 2323 may be set to be large. In this way, impact of the ferromagnetic materials such as the push rod 2323, the first elastic component 2325, and the second elastic component 2326 on the magnetic field of the permanent magnet 2322 may also be avoided. Alternatively, some gaskets made of non-ferromagnetic materials are disposed between the permanent magnet 2322 and the first elastic component 2325 and between the permanent magnet 2322 and the push rod 2323, to avoid impact of the ferromagnetic materials such as the push rod 2323, the first elastic component 2325, and the second elastic component 2326 on the magnetic field of the permanent magnet 2322. This helps improve signal precision of the travel sensor 233.

In a possible implementation, the structure sleeve 2324 includes a main body part 2324-1 and a guiding part 2324-2. The main body part 2324-1 wraps the permanent magnet 2322, that is, the permanent magnet 2322 is located in the main body part 2324-1. The main body part 2324-1 includes a body 2324-3 and a limiting part 2324-4. The limiting part 2324-4 is encircled around an outer wall of the body 2324-3, the limiting part 2324-4 does not completely cover the body 2324-3, and the limiting part 2324-4 is disposed close to the guiding part 2324-2. The structure sleeve 2324 is provided with an anti-rotation groove 2324-5. For example, the anti-rotation groove 2324-5 may be disposed on the limiting part 2324-4.

In a possible implementation, an end face dimension of the guiding part 2324-2 may be set to be less than an end face dimension of the main body part 2324-1. For example, the main body part 2324-1 and the guiding part 2324-2 are cylinders, and a diameter of the main body part 2324-1 is greater than a diameter of the guiding part 2324-2. In this way, one end of the first elastic component 2325 is sleeved on the guiding part 2324-2 and abuts against one end of the main body part 2324-1, and the guiding part 2324-2 with a small dimension is configured to guide and constrain assembly of the first elastic component 2325. This helps avoid a problem such as deflection or sliding of the first elastic component 2325 in a back-and-forth movement process of the first piston 2321.

The push rod 2323 acts on the first piston 2321, one end of the first elastic component 2325 is sleeved on the guiding part 2324-2 and abuts against the main body part 2324-1 to act on the magnet assembly, the first piston 2321 and the magnet assembly (the permanent magnet 2322 and the structure sleeve 2324) move back and forth under a joint action of the push rod 2323, the first elastic component 2325, and the second elastic component 2326, and the travel sensor 233 detects that the movement is transmitted to the control unit 234 in a form of an electrical signal. For example, an operation force applied at the brake pedal 22 is transmitted to the push rod 2323, the push rod 2323 acts on the first separator 2328 and pushes the first piston 2321 to move, the first elastic component 2325 and the second elastic component 2326 are compressed, and apply an elastic force at the magnet assembly, and a direction in which the force is applied by the first elastic component 2325 and the second elastic component 2326 at the magnet assembly is opposite to that in which a force is applied by the push rod 2323 at the first piston 2321. Therefore, the first piston 2321 and the magnet assembly move back and forth under a joint action of the first elastic component 2325, the second elastic component 2326, and the push rod 2323.

Refer to FIG. 6. In a possible implementation, both ends of the second groove 2311-2 are in an open state. For example, the second groove 2311-2 is provided with an open end 2311-3 and a limiting end 2311-4, and both the open end 2311-3 and the limiting end 2311-4 are in an open state. It may also be understood as that the second groove 2311-2 is a through hole, the first piston 2321 is installed on the hydraulic block 231 from the open end 2311-3, and the limiting end 2311-4 is provided with a limiting structure to limit a position of the second elastic component 2326, to prevent the second elastic component 2326 from being detached from the second groove 2311-2. For example, the limiting structure may be a baffle, the baffle is located at the limiting end 2311-4, and the second elastic component 2326 abuts against the baffle. The limiting structure may alternatively be in another form. This is not limited in this disclosure. In this implementation of this disclosure, the second groove 2311-2 is a through hole. In this way, a part of the second elastic component 2326 may extend out of the second groove 2311-2, provided that the second elastic component 2326 can abut against the limiting structure of the limiting end 2311-4. This helps reduce a dimension of the hydraulic block, and facilitates miniaturization of the braking apparatus.

In another implementation, the second groove 2311-2 may alternatively be a blind hole, and the second elastic component 2326 abuts against a right end of the second groove 2311-2, so that a structure of the hydraulic block is simplified, installation is simple, and there is no need to separately dispose the limiting structure for limiting the second elastic component 2326.

Figure 9:
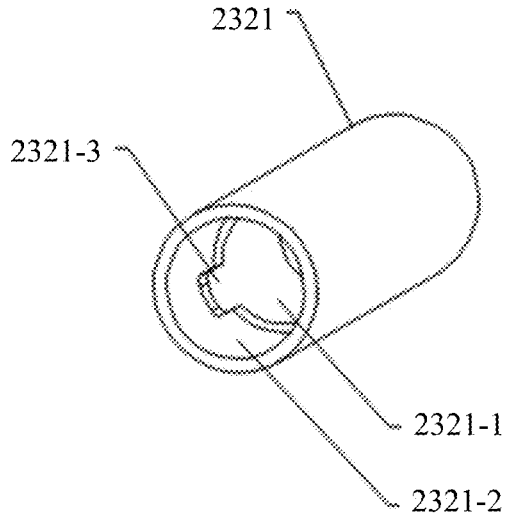
FIG. 9 is a schematic diagram of a structure of a first piston according to an implementation of this disclosure.

In a possible implementation, refer to FIG. 6, FIG. 8, and FIG. 9. FIG. 9 is a schematic diagram of a structure of the first piston 2321. An inner wall of the first piston 2321 includes a first area 2321-1 and a second area 2321-2, and an inner diameter of the first area 2321-1 is less than an inner diameter of the second area 2321-2. The body 2324-3 of the structure sleeve 2324 is disposed in correspondence with the first area 2321-1, the limiting part 2324-4 and the guiding part 2324-2 of the structure sleeve 2324 are disposed in correspondence with the second area 2321-2, and one end of the limiting part 2324-4 away from the guiding part 2324-2 abuts against an end part of the first area 2321-1. The permanent magnet 2322 usually forms the magnet assembly with the structure sleeve 2324 in a form of injection molding, interference fit, or the like. In this way, when the magnet assembly is installed inside the first piston 2321, the limiting part 2324-4 abuts against the end part of the first area 2321-1 to limit a position of the magnet assembly in the first piston 2321, so that the magnet assembly is installed to a preset position, to prevent a problem caused when the magnet assembly is installed in a misplaced manner. For example, the misplaced installation of the permanent magnet causes an increase in the distance between the travel sensor 233 and the permanent magnet 2322, affects the magnetic field at the travel sensor 233, and is not conducive to improving signal precision of the travel sensor 233.

Refer to FIG. 8 and FIG. 9. The braking apparatus 23 is provided with an anti-rotation mechanism 26, and the anti-rotation mechanism 26 is configured to prevent the permanent magnet 2322 from rotating in a circumferential direction of the permanent magnet 2322. The anti-rotation mechanism 26 includes an anti-rotation groove 2324-5 and an anti-rotation rib 2321-3, and the anti-rotation rib 2321-3 is located on an inner wall of the first piston 2321. In a process of installing the magnet assembly inside the first piston 2321, the anti-rotation rib 2321-3 is clamped into the anti-rotation groove 2324-5 of the structure sleeve 2324, to prevent the structure sleeve 2324 from rotating in a circumferential direction of the structure sleeve 2324 in the first piston 2321, that is, prevent the permanent magnet 2322 and the structure sleeve 2324 from rotating in the circumferential directions of the permanent magnet 2322 and the structure sleeve 2324 in the first piston 2321. The sensing element 2333 of the travel sensor 233 determines a linear travel position of the permanent magnet 2322 based on a sensed magnetic field angle change. However, in a process of magnetizing, the permanent magnet 2322 inevitably has a magnetic deflection angle relative to an axis, which is generally within 5°. If the permanent magnet 2322 moves linearly relative to the sensing element 2333, and also rotates in the circumferential direction, consistency between a magnetic deflection angle of the travel sensor 233 and a magnetic deflection angle in a calibration state is changed, thereby affecting signal precision of the travel sensor 233. In this disclosure, both the permanent magnet 2322 and the structure sleeve 2324 are coaxially disposed with the first piston 2321. In this implementation of this disclosure, the anti-rotation rib 2321-3 is clamped into the anti-rotation groove 2324-5, to prevent the structure sleeve 2324 from rotating in the circumferential direction of the structure sleeve 2324 in the first piston 2321, that is, prevent the permanent magnet 2322 from rotating in the circumferential direction of the permanent magnet 2322 in the first piston 2321. This helps improve measurement precision, and ensures consistency of measurement precision in a plurality of times of back-and-forth movement. A structure in which the anti-rotation groove 2324-5 and the anti-rotation rib 2321-3 cooperate is disposed, so that in a process of installing the structure sleeve 2324 on the first piston 2321, initial positioning and installation can be implemented provided that the anti-rotation rib 2321-3 is clamped in the anti-rotation groove 2324-5, to improve installation efficiency. In addition, a travel measurement error caused by uneven magnetization of the permanent magnet can also be avoided.

It should be noted that the anti-rotation rib 2321-3 and the anti-rotation groove 2324-5 are merely an implementation of preventing the magnet assembly from rotating in a circumferential direction of the magnet assembly in the first piston 2321, and there is another design structure of a combination of the anti-rotation rib and the anti-rotation groove. In some implementations, an anti-rotation design form such as interference fit, a snap, crimping, and glue filling may alternatively be used.

In the magnet assembly, the permanent magnet 2322 is usually fixed with the structure sleeve 2324 in a form of injection molding, interference fit, or the like, to ensure that the permanent magnet 2322 does not rotate relative to a ground axis in the structure sleeve 2324. In addition, the first piston 2321 and the hydraulic block 231 also have a similar anti-rotation structure directly or indirectly. To be specific, there are anti-rotation constraints between the permanent magnet 2322 and the structure sleeve 2324, between the structure sleeve 2324 and the first piston 2321, and between the first piston 2321 and the hydraulic block 231 directly or indirectly, to ensure that in a process in which the push rod 2323 pushes the first piston 2321 and the permanent magnet 2322 to move back and forth, the magnetic deflection angle of the permanent magnet 2322 is always consistent with that of the sensing element 2333, that is, ensure precision consistency of the travel sensor 233.

In some possible implementations, the structure sleeve 2324 and the first piston 2321 may be noncoaxially disposed, and the structure sleeve 2324 is disposed on one side of the travel sensor 233. Alternatively, the permanent magnet 2322 and the structure sleeve 2324 may be noncoaxially disposed, and the permanent magnet 2322 is disposed on one side of the travel sensor 233. In this way, the distance from the permanent magnet 2322 to the travel sensor 233 is reduced, and signal precision of the travel sensor 233 is improved.

Refer to FIG. 6 and FIG. 8. There are two first pistons in this implementation. One is the first piston 2321, and the other is the second piston 2327. The second piston 2327 is internally provided with a second separator 2327-1. The first elastic component 2325 is located on a side that is of the second separator 2327-1 and that is close to the first piston 2321. The second elastic component 2326 is located on a side that is of the second separator 2327-1 and that is away from the first piston 2321. The second separator 2327-1 and the second piston 2327 may be of an integrated structure, and the structure is simple, which avoids a process of assembling. The second separator 2327-1 and the second piston 2327 may alternatively be of a split structure. In the split structure, the second separator 2327-1 may be installed in the second piston 2327 through interference fit, and it is ensured that the second piston 2327 is isolated into two spaces that are not in communication. In a normal braking process, a booster unit of the braking apparatus works normally, a liquid outlet on the hydraulic block 231 corresponding to the second elastic component 2326 is closed, and the brake fluid is filled between the second elastic component 2326 and the hydraulic block 231 and cannot be discharged. Therefore, the second elastic component 2326 cannot be compressed, only the first elastic component 2325 is compressed, and the booster unit of the braking apparatus and the first elastic component 2325 jointly provide power for back-and-forth movement of the first piston 2321. When the booster unit is invalid, the liquid outlet on the hydraulic block 231 corresponding to the second elastic component 2326 is opened, and both the first elastic component 2325 and the second elastic component 2326 are compressed.

Design of the two elastic components, namely, the first elastic component 2325 and the second elastic component 2326, increases reliability of the braking apparatus 23, and the second piston 2327 limits the first elastic component 2325 and the second elastic component 2326. The first elastic component 2325 and the second elastic component 2326 may be springs, or may be other elastic apparatuses. This is not limited in this disclosure.

In a possible implementation, refer to FIG. 3 and FIG. 5. The braking apparatus 23 is provided with a solenoid valve 236, the solenoid valve 236 is located in the control unit 234 and is fixed on the top of the hydraulic block 231, the solenoid valve 236 is electrically connected to the control substrate 2342 of the control unit 234, and the solenoid valve 236 is disposed away from the travel sensor 233. There is a plurality of hydraulic pipelines inside the hydraulic block 231. The solenoid valve 236 is configured to control opening and closing of the pipelines inside the hydraulic block 231. However, when the solenoid valve 236 works, a strong electromagnetic field is generated, and magnetic leakage interferes with a magnetic field signal transmitted by the permanent magnet 2322 to the sensing element 2333. Consequently, precision of an output signal of the travel sensor 233 is affected. In an implementation of this disclosure, a value of a safety distance is set based on a straight-line distance from the solenoid valve 236 to the sensing element 2333. In a possible implementation, the value of the safety distance may be obtained through magnetic leakage simulation analysis of the solenoid valve 236 and precision simulation analysis of the sensing element 2333. In another possible implementation, the value of the safety distance may alternatively be obtained through an experiment or a combination of an experiment and simulation. The solenoid valve 236 is disposed away from the sensing element 2333 of the travel sensor 233, and is further disposed as required.

Refer to FIG. 5. The independent travel sensor 233 is disposed on one side of the master cylinder part 232 and is disposed adjacent to the master cylinder part 232. The travel sensor 233 may be disposed on any side of the master cylinder part 232 as required. In an implementation of this disclosure, the travel sensor 233 and the master cylinder part 232 are arranged in a direction perpendicular to that in which the hydraulic block 231 and the control unit 234 are stacked. In this implementation, the travel sensor 233 is disposed on one side of the master cylinder part 232 in a direction perpendicular to that in which the hydraulic block 231 and the control unit 234 are stacked. This simplifies a structure of the travel sensor 233. The first groove 2311-1 may be a deep groove, and the sensing element 2333 of the travel sensor 233 is deep into the first groove 2311-1, and is not vulnerable to impact of magnetic leakage of the solenoid valve 236 inside the control unit 234. This helps improve signal precision of the travel sensor 233.

Figure 10:
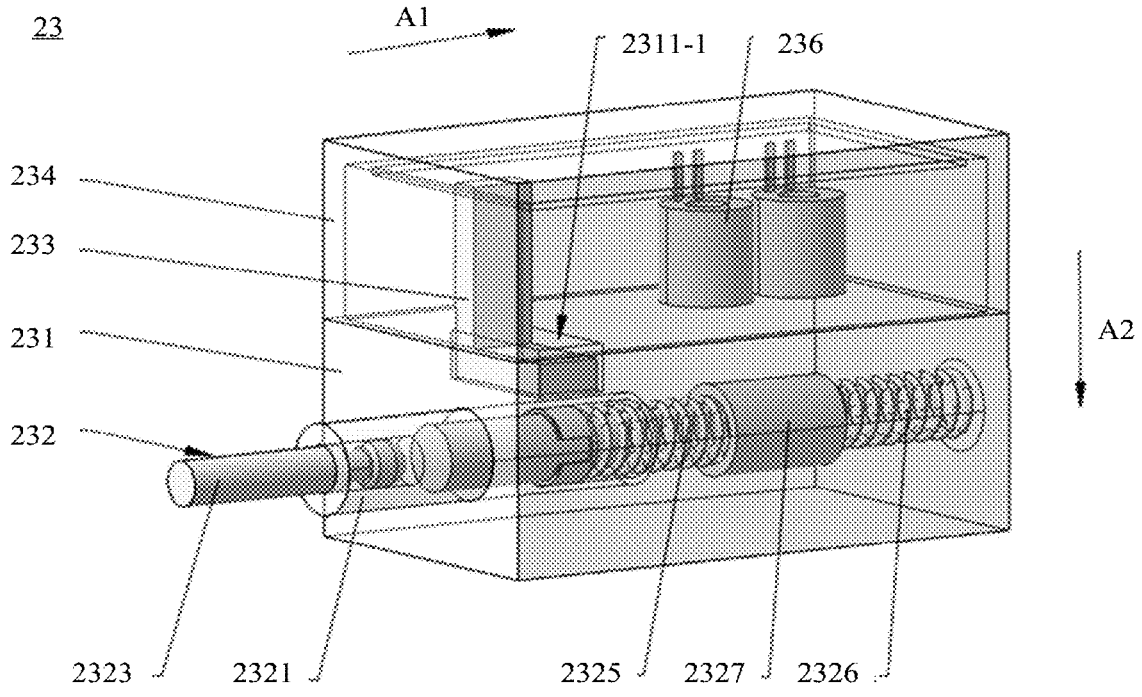
FIG. 10 is a schematic diagram of a structure of a braking apparatus according to an implementation of this disclosure.

FIG. 10 is a schematic diagram of a structure of the braking apparatus 23 according to an embodiment of this disclosure. The travel sensor 233 may be disposed on any side of the master cylinder part 232 as required, and the independent travel sensor 233 is disposed on one side of the master cylinder part 232 and is disposed adjacent to the master cylinder part 232. In this implementation, the first groove 2311-1 is located between the master cylinder part 232 and the control unit 234. In other words, the travel sensor 233 is located on a side that is of the master cylinder part 232 that is close to the control unit 234. In this implementation, the first groove 2311-1 is located between the master cylinder part 232 and the control unit 234. In this way, the first groove 2311-1 is a shallow groove. This helps improve feasibility of more reasonable layout for pipelines arranged vertically and horizontally inside the hydraulic block 231, has less interference with pipeline arrangement inside the hydraulic block 231, and facilitates miniaturization and processing convenience of the braking apparatus 23.

It may be understood that the positions of the travel sensor 233 in the braking apparatus 23 shown in FIG. 10 and the braking apparatus 23 shown in FIG. 3 are different. Therefore, the second directions A2 in the braking apparatus 23 shown in FIG. 10 and the braking apparatus 23 shown in FIG. 3 are different.

Figure 11:
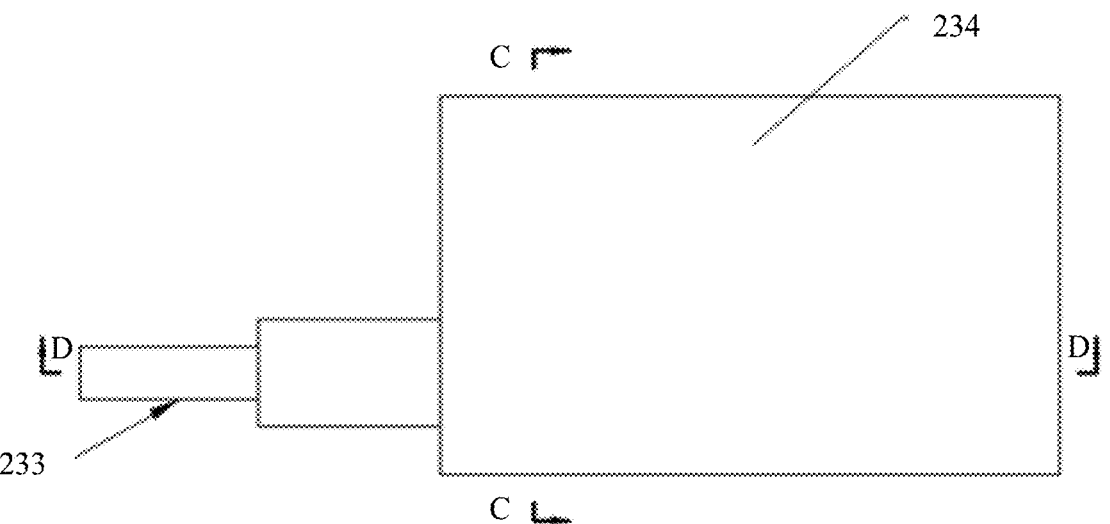
FIG. 11 is a top view of the braking apparatus shown in FIG. 10.
Figure 12:
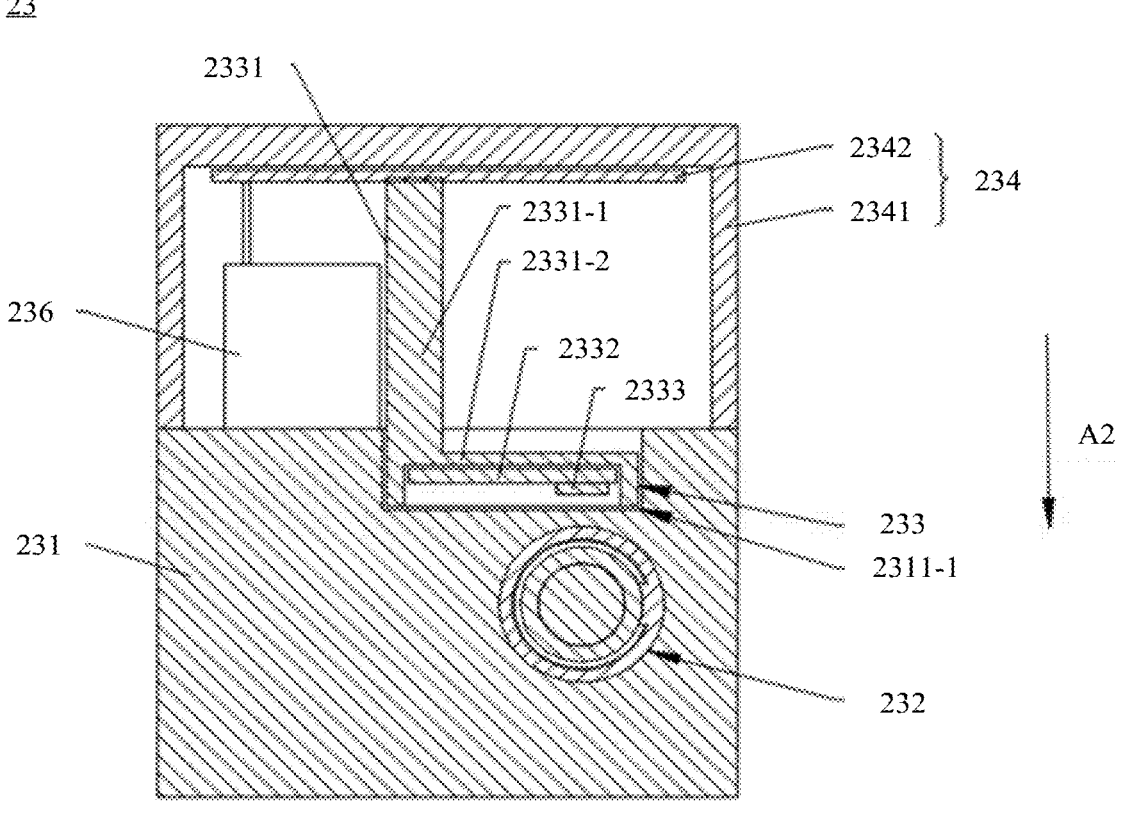
FIG. 12 is a sectional view of the braking apparatus shown in FIG. 11 along C-C.
Figure 13:
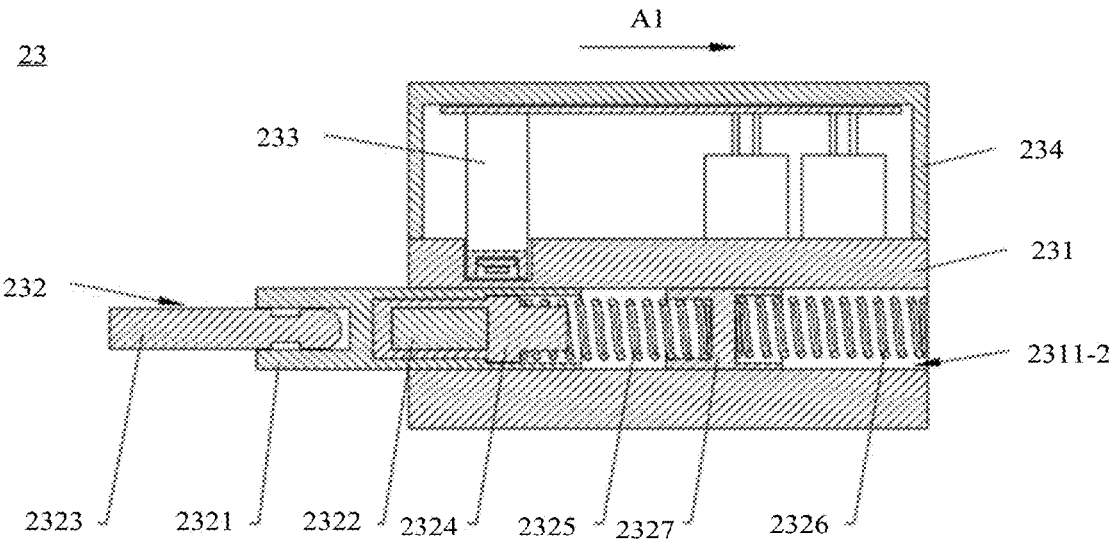
FIG. 13 is a sectional view of the braking apparatus shown in FIG. 11 along D-D.

As shown in FIG. 11, FIG. 12, and FIG. 13, FIG. 11 is a top view of the braking apparatus 23 shown in FIG. 10, FIG. 12 is a sectional view of the braking apparatus 23 shown in FIG. 11 along C-C, and FIG. 13 is a sectional view of the braking apparatus 23 shown in FIG. 11 along D-D. The housing 2331 of the travel sensor 233 includes a connecting part 2331-1 and a mounting part 2331-2. The connecting part 2331-1 and the mounting part 2331-2 are disposed in an included angle. The mounting part 2331-2 is located in the first groove 2311-1 and is fixedly connected to the hydraulic block 231. The sensing element 2333 and the sensing substrate 2332 are located in the mounting part 2331-2. One end of the connecting part 2331-1 is connected to the mounting part 2331-2, and the other end of the connecting part 2331-1 extends into the control unit 234. For example, the included angle between the connecting part 2331-1 and the mounting part 2331-2 may be 90°, and the connecting part 2331-1 and the mounting part 2331-2 may be of an L-shaped structure. Disposing of the connecting part 2331-1 and the mounting part 2331-2 of the L-shaped structure helps implement disposing of the sensing element 2333 close to the permanent magnet 2322, improve travel detection precision, and implement an electrical connection between the sensing substrate 2332 and the control substrate 2342. When the first groove 2311-1 is located between the master cylinder part 232 and the control unit 234, that is, when the travel sensor 233 is located on a side that is of the master cylinder part 232 and that is close to the control unit 234, to facilitate the electrical connection between the sensing substrate 2332 of the travel sensor 233 and the control substrate 2342 of the control unit 234, the housing 2331 of the travel sensor 233 may be designed as an L-shaped structure, that is, the connecting part 2331-1 and the mounting part 2331-2 form an L-shaped structure. There is a conductive element inside the housing 2331 of the L-shaped structure, so that an effective electrical connection between the sensing substrate 2332 and the control substrate 2342 is implemented, to transmit an electrical signal generated by the sensing element 2333 to the control unit 234. The electrical connection between the travel sensor 233 and the control substrate 2342 may be a connector clip, spring contact, metal pad contact, or the like. This is not limited in this disclosure.

A difference between the structure of the braking apparatus 23 shown in FIG. 10 to FIG. 13 and the structure of the braking apparatus 23 shown in FIG. 3 to FIG. 6 lies in differences of the position and the structure of the travel sensor 233. For descriptions of another structure, refer to the foregoing descriptions. Details are not described herein again. In some possible implementations, the travel sensor 233 may alternatively be disposed on another side of the master cylinder part 232. A shape and a depth of the first groove 2311-1 are not limited to those shown in FIG. 5 and FIG. 12, and the first groove may alternatively be disposed in an inclined manner. This is not limited in this disclosure.

Figure 14:
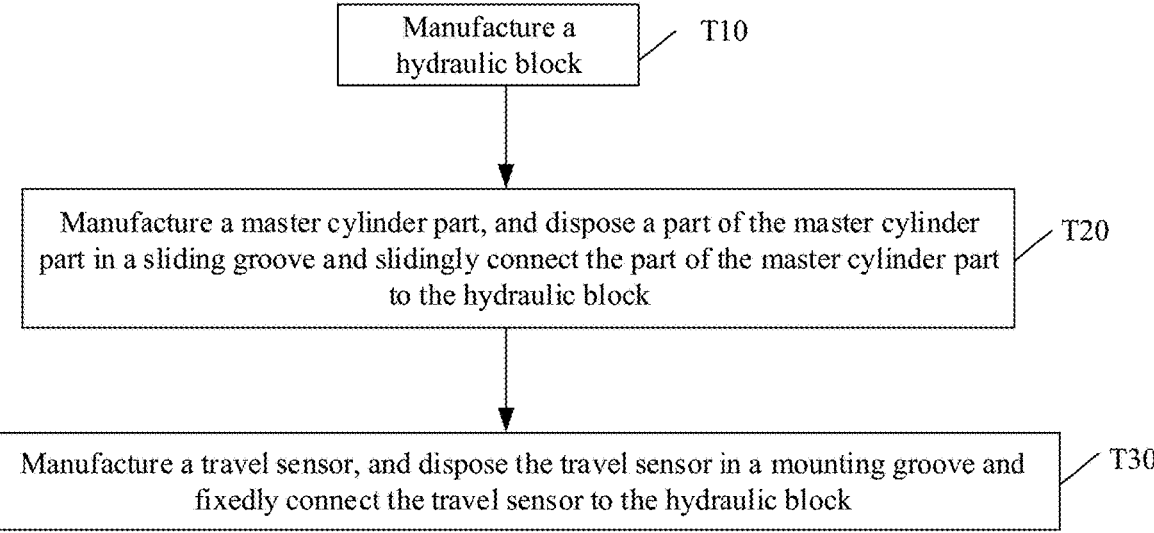
FIG. 14 is a flowchart of an installation method of a braking apparatus according to an implementation of this disclosure.

The braking apparatus 23 provided in this implementation of this disclosure has a simple structure. This greatly simplifies assembly difficulty of the braking apparatus 23. An implementation of this disclosure provides an installation method of the braking apparatus 23. As shown in FIG. 14, an installation method of the braking apparatus 23 according to an implementation includes the following steps:

T10: Manufacture the hydraulic block.

Refer to FIG. 5 and FIG. 6. The hydraulic block 231 is provided with the first groove 2311-1 and the second groove 2311-2, the first groove 2311-1 is disposed close to the second groove 2311-2, and the second groove 2311-2 extends in the first direction A1.

T20: Manufacture the master cylinder part, and dispose a part of the master cylinder part in the second (sliding) groove and slidingly connect the part of the master cylinder part to the hydraulic block.

The master cylinder part 232 includes the first piston 2321. The first piston 2321 is disposed in the second groove 2311-2 and is slidingly connected to the hydraulic block 231. The first piston 2321 is internally provided with the permanent magnet 2322, that is, the master cylinder part 232 is provided with the permanent magnet 2322. The first piston 2321 may move back and forth in the first direction A1, and the permanent magnet 2322 may move back and forth in the first direction A1 with the first piston 2321. The permanent magnet 2322 and the first piston 2321 remain relatively static.

T30: Manufacture the travel sensor, and dispose the travel sensor in the first (mounting) groove and fixedly connect the travel sensor to the hydraulic block.

The travel sensor 233 is disposed on a periphery of the permanent magnet 2322, and the travel sensor 233 and the first groove 2311-1 are disposed close to the permanent magnet 2322. The travel sensor 233 is configured to detect a movement amount of the permanent magnet 2322, to determine a movement amount of the first piston 2321.

In this disclosure, a dimension chain between the travel sensor 233 and the permanent magnet 2322 is reduced and signal precision of the travel sensor 233 is improved through a reasonable layout of the permanent magnet 2322 and the travel sensor 233. The braking apparatus 23 in this disclosure has a simple structure. This greatly simplifies actual assembly complexity. The permanent magnet 2322 is disposed in the first piston of the master cylinder part 232, the master cylinder part 232 is installed on the hydraulic block 231, and the travel sensor 233 is fixed on the hydraulic block 231, so that time is short, assembly efficiency is high, an assembly yield rate is high, and costs are low. This is conducive to industrialization of the braking apparatus 23. The travel sensor 233 is directly fixed on the hydraulic block 231. This reduces the dimension chain between the travel sensor 233 and the permanent magnet 2322, and helps improve signal precision of the travel sensor 233.

In some possible implementations, the installation method of the braking apparatus 23 further includes manufacturing the control unit 234, disposing the control unit 234 and the hydraulic block 231 in a stacked manner, and fixing the control unit 234 to the hydraulic block 231. For example, the braking apparatus 23 includes the control unit 234, and an opening of the first groove 2311-1 faces the control unit 234. The control unit 234 and the hydraulic block 231 are disposed in a stacked manner, the first groove 2311-1 communicates with internal space of the control unit 234, and the travel sensor 233 extends into the internal space of the control unit 234, to implement sealing of the travel sensor 233. The control unit 234 may be assembled and fixed with the hydraulic block 231 through guide tooling.

In other words, a part of the travel sensor 233 extends into the first groove 2311-1 and is disposed adjacent to the permanent magnet 2322, and the other part of the travel sensor 233 extends into the internal space of the control unit 234 and is configured to be electrically connected to the control substrate 2342. The hydraulic block 231 and the control unit 234 jointly perform a sealing function on the travel sensor 233, to prevent dust or water from an external environment from entering the travel sensor 233 and affecting performance of the travel sensor 233. The travel sensor 233 is always in a sealed environment formed by the hydraulic block 231 and the control unit 234, and does not need to perform sealing protection (where for example, a side that is of the housing 2331 of the travel sensor 233 and that faces the master cylinder part 232 may be provided with an opening, and the housing 2311-1 does not completely isolate the sensing substrate 2332 and the sensing element 2333 from the outside), so that costs are reduced. In addition, the sensing substrate 2332 and the sensing element 2333 in the travel sensor 233 do not need to be sealed for protection. This also reduces a volume of the travel sensor 233, and saves an internal space of the braking apparatus 23.

In some possible implementations, the master cylinder part 232 may be first installed on the hydraulic block 231, then the travel sensor 233 is installed on the hydraulic block 231, and then the control unit 234 is installed on the hydraulic block 231. Alternatively, the travel sensor 233 may be first installed on the hydraulic block 231, then the master cylinder part 232 is installed on the hydraulic block 231, and then the control unit 234 is installed on the hydraulic block 231. Alternatively, the travel sensor 233 may be first installed on the hydraulic block 231, then the control unit 234 is installed on the hydraulic block 231, and then the master cylinder part 232 is installed on the hydraulic block 231. This is not limited in this disclosure.

In this disclosure, the dimension chain between the permanent magnet 2322 and the travel sensor 233 is reduced through a reasonable layout of the permanent magnet 2322 and the travel sensor 233. This helps improve signal precision of the travel sensor 233. In addition, the travel sensor 233 is disposed close to the permanent magnet 2322, to reduce a gap between the permanent magnet 2322 and the travel sensor 233 as much as possible. This effectively improves signal precision of the travel sensor 233.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A braking apparatus comprising:
  a hydraulic block comprising:
    a first groove; and
    a second groove disposed proximate to the first groove and extending in a first direction;
  a master cylinder part located in the second groove, in sliding contact with the second groove and comprising a permanent magnet;
  a travel sensor located in the first groove, fixedly coupled to the hydraulic block, and configured to detect a movement amount of the permanent magnet, wherein the travel sensor comprises a housing including a mounting part located in the first groove and fixedly coupled to the hydraulic block; and
  a structure sleeve made of a non-ferromagnetic material, located inside the master cylinder part, and configured to wrap the permanent magnet.

2. The braking apparatus of claim 1, wherein the travel sensor comprises a sensing element located in the first groove, and wherein a distance between the sensing element and the permanent magnet is less than a threshold.

3. The braking apparatus of claim 2, wherein the hydraulic block comprises a pipeline configured to transmit a brake fluid, and wherein the pipeline is arranged in the hydraulic block to avoid an area between the first groove and the second groove.

4. The braking apparatus of claim 2, wherein the first groove and the second groove are sealed and isolated.

5. The braking apparatus of claim 1, wherein the permanent magnet is configured to move between a first position and a second position, wherein a central position between the first position and the second position is vertically projected on the travel sensor in a second direction, and wherein the second direction is perpendicular to the first direction.

6. The braking apparatus of claim 1, further comprising a controller comprising an internal space, wherein the controller and the hydraulic block are disposed in a stacked manner, wherein the first groove comprises an opening that faces the controller, wherein the first groove is coupled with the internal space, and wherein the travel sensor is further configured to extend into the internal space.

7. The braking apparatus of claim 6, further comprising a sealing structure located between the controller and the hydraulic block.

8. The braking apparatus of claim 6, wherein the travel sensor and the master cylinder part are arranged in a second direction perpendicular to a third direction in which the hydraulic block and the controller are stacked.

9. The braking apparatus of claim 6, wherein the first groove is located between the master cylinder part and the controller.

10. The braking apparatus of claim 9, wherein the housing comprises:
  a sensing element located in the mounting part; and
  a connecting part comprising:
    a first end coupled to the mounting part; and
    a second end extending into the controller.

11. The braking apparatus of claim 6, wherein the controller comprises a control substrate, and wherein the braking apparatus further comprises a solenoid valve located in the controller, disposed away from the travel sensor, and electrically coupled to the control substrate.

12. The braking apparatus of claim 1, wherein the structure sleeve comprises:
  a main body part configured to wrap the permanent magnet; and
  a guiding part,
  wherein the master cylinder part comprises an elastic component comprising a first end that is sleeved on the guiding part and configured to abut against the main body part.

13. The braking apparatus of claim 12, wherein the master cylinder part comprises a first piston, wherein the first piston comprises an inner wall comprising:
  a first area comprising an end part; and
  a second area,
  wherein the permanent magnet and the structure sleeve are both located inside the first piston, and
  wherein the main body part comprises:

a body comprising an outer wall and configured to contact the first area; and a limiting part encircled around the outer wall, configured to contact the second area, and configured to abut against the end part.

14. The braking apparatus of claim 1, further comprising an anti-rotation mechanism configured to prevent the permanent magnet from rotating in a circumferential direction of the permanent magnet.

15. The braking apparatus of claim 14, wherein the master cylinder part comprises a first piston comprising an inner wall, wherein the permanent magnet and the structure sleeve are both located inside the first piston, and wherein the anti-rotation mechanism comprises:

an anti-rotation groove located in the structure sleeve; and an anti-rotation rib located on the inner wall and clamped into the anti-rotation groove.

16. A braking system comprising:

a braking apparatus comprising:
  a hydraulic block comprising:
    a first groove; and
    a second groove disposed proximate to the first groove and extending in a first direction;
  a master cylinder part located in the second groove in sliding contact with the second groove and comprising a permanent magnet; and magnet;
  a travel sensor located in the first groove, fixedly coupled to the hydraulic block, and configured to detect a movement amount of the permanent magnet, wherein the travel sensor comprises a housing including a mounting part located in the first groove and fixedly coupled to the hydraulic block; and
  a structure sleeve made of a non-ferromagnetic material, located inside the master cylinder part, and configured to wrap the permanent magnet;
a wheel brake; and
a wheel braking loop coupled to the hydraulic block and the wheel brake.

17. The braking system of claim 16, wherein the structure sleeve comprises:

a main body part configured to wrap the permanent magnet; and a guiding part, wherein the master cylinder part comprises an elastic component comprising a first end that is sleeved on the guiding part and configured to abut against the main body part.

18. A vehicle comprising:

a wheel; and a braking system comprising:
  a braking apparatus comprising:
    a hydraulic block comprising:
      a first groove; and
      a second groove disposed proximate to the first groove and extending in a first direction;
    a master cylinder part located in the second groove in sliding contact with the second groove and comprising a permanent magnet;
    a travel sensor located in the first groove, fixedly coupled to the hydraulic block, and configured to detect a movement amount of the permanent magnet, wherein the travel sensor comprises a housing including a mounting part located in the first groove and fixedly coupled to the hydraulic block;
    a structure sleeve made of a non-ferromagnetic material, located inside the master cylinder part, and configured to wrap the permanent magnet;
  a wheel brake configured to act on the wheel; and
  a wheel braking loop coupled to the hydraulic block and the wheel brake.

19. The vehicle of claim 18, wherein the travel sensor comprises a sensing element located in the first groove, and wherein a distance between the sensing element and the permanent magnet is less than a threshold.

20. The vehicle of claim 19, wherein the hydraulic block comprises a pipeline configured to transmit a brake fluid, and wherein the pipeline is arranged in the hydraulic block to avoid an area between the first groove and the second groove.

* * * * *